(12) United States Patent
Arora et al.

(10) Patent No.: US 11,003,698 B2
(45) Date of Patent: May 11, 2021

(54) ITEM MATCHING

(71) Applicant: eBay Inc., San Jose, CA (US)

(72) Inventors: Aditya Arora, Pleasanton, CA (US);
Gurudatta Horantur Shivaswamy,
Saratoga, CA (US); Brian M. Johnson,
Santa Clara, CA (US); **Richard D.
Henderson, San Jose, CA (US); Swati
Agarwal**, Sunnyvale, CA (US);
Jennifer M. Dante, Mountain View,
CA (US)

(73) Assignee: eBay Inc., San Jose, CA (US)

( * ) Notice: Subject to any disclaimer, the term of this patent is extended or adjusted under 35 U.S.C. 154(b) by 440 days.

(21) Appl. No.: 15/428,910

(22) Filed: Feb. 9, 2017

(65) Prior Publication Data

US 2017/0154102 A1 Jun. 1, 2017

Related U.S. Application Data

(63) Continuation of application No. 12/234,439, filed on Sep. 19, 2008, now Pat. No. 9,576,021.

(51) Int. Cl.
*G06F 7/00* (2006.01)
*G06F 16/33* (2019.01)
*G06F 16/35* (2019.01)
*G06F 16/242* (2019.01)
*G06F 16/338* (2019.01)

(52) U.S. Cl.
CPC ......... *G06F 16/334* (2019.01); *G06F 16/243* (2019.01); *G06F 16/338* (2019.01); *G06F 16/35* (2019.01)

(58) Field of Classification Search
CPC ...... G06F 16/334; G06F 16/243; G06F 16/35; G06F 16/338
See application file for complete search history.

(56) References Cited

U.S. PATENT DOCUMENTS

| | | |
|---|---|---|
| 6,094,652 A | 7/2000 | Faisal |
| 6,785,671 B1 | 8/2004 | Bailey et al. |
| 7,082,426 B2 | 7/2006 | Musgrove et al. |
| 7,139,769 B2 | 11/2006 | Duchi |
| 7,359,871 B1 | 4/2008 | Paasche et al. |
| 7,409,393 B2 | 8/2008 | Gregoire et al. |
| 8,032,506 B1 | 10/2011 | Gregov et al. |
| 8,209,318 B2 | 6/2012 | Lee |
| 8,249,885 B2 | 8/2012 | Berkowitz et al. |

(Continued)

OTHER PUBLICATIONS

Applicant-Initiated Interview Summary received for U.S. Appl. No. 15/480,590, dated Aug. 9, 2018, 3 pages.

(Continued)

*Primary Examiner* — Azam M Cheema
(74) *Attorney, Agent, or Firm* — Shook, Hardy & Bacon L.L.P.

(57) ABSTRACT

Methods and system for item matching are described. In one embodiment, compatibility-based text for an item may be accessed. A compatibility identifier may be identified based on the compatibility-based text. The compatibility identifier may be associated with an item duster. The compatibility identifier may be used to identify a plurality of matching items. A result may be provided based on identification of the plurality of matching items. Additional methods and systems are disclosed.

17 Claims, 23 Drawing Sheets

(56) References Cited

U.S. PATENT DOCUMENTS

| | | | |
|---|---|---|---|
| 8,762,214 | B1 | 6/2014 | Daniel et al. |
| 8,850,362 | B1* | 9/2014 | Khoshnevisan .... G06F 16/9027 715/853 |
| 9,576,021 | B2 | 2/2017 | Arora et al. |
| 10,360,250 | B2 | 7/2019 | Shivaswamy et al. |
| 2002/0145002 | A1 | 10/2002 | Hung |
| 2003/0145002 | A1 | 7/2003 | Kleinberger et al. |
| 2003/0149679 | A1 | 8/2003 | Na et al. |
| 2004/0143600 | A1 | 7/2004 | Musgrove et al. |
| 2004/0172393 | A1 | 9/2004 | Kazi et al. |
| 2005/0187915 | A1* | 8/2005 | De Lury .............. G06F 16/958 |
| 2005/0251409 | A1 | 11/2005 | Johnson et al. |
| 2006/0242147 | A1 | 10/2006 | Gehrking et al. |
| 2007/0033221 | A1 | 2/2007 | Copperman et al. |
| 2007/0143266 | A1 | 6/2007 | Tang et al. |
| 2007/0143327 | A1 | 6/2007 | Rivas et al. |
| 2008/0243638 | A1 | 10/2008 | Chan et al. |
| 2009/0153327 | A1 | 6/2009 | Hartwig et al. |
| 2010/0082571 | A1 | 4/2010 | Shivaswamy et al. |
| 2010/0082572 | A1 | 4/2010 | Arora et al. |
| 2010/0082623 | A1 | 4/2010 | Arora et al. |
| 2017/0154102 | A1 | 6/2017 | Arora et al. |
| 2017/0212956 | A1 | 7/2017 | Shivaswamy et al. |
| 2019/0294622 | A1 | 9/2019 | Shivaswamy et al. |

OTHER PUBLICATIONS

Applicant-Initiated Interview Summary received for U.S. Appl. No. 15/480,590, dated Feb. 12, 2019, 3 pages.
Final Office Action received for U.S. Appl. No. 15/480,590, dated Nov. 29, 2018, 9 pages.
First Action Pre-Interview received for U.S. Appl. No. 15/480,590, dated Nov. 30, 2017, 4 pages.
Notice of Allowance received for U.S. Appl. No. 15/480,590, dated Mar. 12, 2019, 8 pages.
Preliminary Amendment for U.S. Appl. No. 15/480,590, filed Jun. 1, 2017, 7 pages.
Response to Final Office Action filed on Feb. 8, 2019, for U.S. Appl. No. 15/480,590, dated Nov. 29, 2018, 10 pages.
Response to Non-Compliant Amendment filed on Jul. 10, 2018, for U.S. Appl. No. 15/480,590, dated May 10, 2018, 7 pages.
Notice of Non-Compliant Amendment received for U.S. Appl. No. 15/480,590, dated May 10, 2018, 3 pages.
Response to Decision on Appeal filed on May 18, 2015, for U.S. Appl. No. 12/234,377, 9 pages.
Appeal Brief filed on Jul. 3, 2013, for U.S. Appl. No. 12/234,404, 19 pages.
Examiner's Answer to Appeal Brief for U.S. Appl. No. 12/234,404, dated Aug. 15, 2013, 6 pages.
Reply Brief filed on Oct. 15, 2013, for U.S. Appl. No. 12/234,404, dated Aug. 15, 2013, 4 pages.
"U.S. Appl. No. 12/234,377, Advisory Action dated Sep. 30, 2011", 3 pgs.
"U.S. Appl. No. 12/234,377, Appeal Brief filed Jan. 16, 2012", 24 pgs.
"U.S. Appl. No. 12/234,377, Appeal Decision dated Mar. 16, 2015", 7 pgs.
"U.S. Appl. No. 12/234,377, Decision on Pre-Appeal Brief Request dated Dec. 14, 2011", 24 pgs.
"U.S. Appl. No. 12/234,377, Examiner Interview Summary dated Sep. 8, 2015", 3 pgs.
"U.S. Appl. No. 12/234,377, Examiner's Answer to Appeal Brief 7dated Mar. 30, 2012", 11 pgs.
"U.S. Appl. No. 12/234,377, Final Office Action dated Jul. 7, 2011", 10 pgs.
"U.S. Appl. No. 12/234,377, Final Office Action dated Nov. 6, 2015", 11 pgs.
"U.S. Appl. No. 12/234,377, Final Office Action dated Dec. 6, 2016", 13 pgs.
"U.S. Appl. No. 12/234,377, Non Final Office Action dated Mar. 4, 2011", 10 pgs.
"U.S. Appl. No. 12/234,377, Non Final Office Action dated May 19, 2016", 12 pgs.
"U.S. Appl. No. 12/234,377, Non Final Office Action dated Jun. 1, 2015", 10 pgs.
"U.S. Appl. No. 12/234,377, Pre-Appeal Brief Request filed Oct. 6, 2011", 5 pgs.
"U.S. Appl. No. 12/234,377, Response filed Mar. 2, 2016 to Final Office Action dated Nov. 6, 2015", 10 pgs.
"U.S. Appl. No. 12/234,377, Response filed May 11, 2011 to Non Final Office Action dated Mar. 4, 2011", 14 pgs.
"U.S. Appl. No. 12/234,377, Response filed Aug. 19, 2016 to Non Final Office Action dated May 19, 2016", 12 pgs.
"U.S. Appl. No. 12/234,377, Response filed Sep. 1, 2015 to Non Final Office Action dated Jun. 1, 2015", 10 pgs.
"U.S. Appl. No. 12/234,377, Response filed Sep. 7, 2011 to Final Office Action dated Jul. 7, 2011", 13 pgs.
"U.S. Appl. No. 12/234,404, Appeal Decision dated Dec. 21, 2016", 7 pgs.
"U.S. Appl. No. 12/234,404, Examiner Interview Summary dated Jun. 12, 2013", 3 pgs.
"U.S. Appl. No. 12/234,404, Final Office Action dated Mar. 5, 2013", 13 pgs.
"U.S. Appl. No. 12/234,404, Final Office Action dated Jun. 20, 2011", 14 pgs.
"U.S. Appl. No. 12/234,404, Non Final Office Action dated Jul. 5, 2012", 12 pgs.
"U.S. Appl. No. 12/234,404, Non Final Office Action dated Nov. 25, 2011", 11 pgs.
"U.S. Appl. No. 12/234,404, Non Final Office Action dated Dec. 16, 2010", 14 pgs.
"U.S. Appl. No. 12/234,404, Response filed Apr. 11, 2011 to Non Final Office Action dated Dec. 16, 2010", 10 pgs.
"U.S. Appl. No. 12/234,404, Response filed May 24, 2012 to Non Final Office Action dated Nov. 25, 2011", 11 pgs.
"U.S. Appl. No. 12/234,404, Response filed Oct. 20, 2011 to Final Office Action dated Jun. 20, 2011", 10 pgs.
"U.S. Appl. No. 12/234,439, Appeal Brief filed Jul. 16, 2013", 14 pgs.
"U.S. Appl. No. 12/234,439, Appeal Decision dated Jun. 28, 2016", 6 pgs.
"U.S. Appl. No. 12/234,439, Examiner Interview Summary dated Jun. 18, 2013", 3 pgs.
"U.S. Appl. No. 12/234,439, Examiner's Answer to Appeal Brief dated Aug. 15, 2013", 12 pgs.
"U.S. Appl. No. 12/234,439, Final Office Action dated Apr. 25, 2013", 42 pgs.
"U.S. Appl. No. 12/234,439, Final Office Action dated Jun. 22, 2011", 45 pgs.
"U.S. Appl. No. 12/234,439, Final Office Action dated Jun. 22, 2012", 32 pgs.
"U.S. Appl. No. 12/234,439, Non Final Office Action dated Nov. 8, 2012", 36 pgs.
"U.S. Appl. No. 12/234,439, Non Final Office Action dated Nov. 14, 2011", 49 pgs.
"U.S. Appl. No. 12/234,439, Non Final Office Action dated Dec. 27, 2010", 28 pgs.
"U.S. Appl. No. 12/234,439, Notice of Allowance dated Oct. 7, 2016", 8 pgs.
"U.S. Appl. No. 12/234,439, Reply Brief filed Oct. 15, 2013", 6 pgs.
"U.S. Appl. No. 12/234,439, Response filed Feb. 8, 2013 to Non Final Office Action dated Nov. 8, 2012", 14 pgs.
"U.S. Appl. No. 12/234,439, Response filed Mar. 28, 2011 to Non Final Office Action dated Dec. 27, 2010", 10 pgs.
"U.S. Appl. No. 12/234,439, Response filed May 14, 2012 to Non Final Office Action dated Nov. 14, 2011", 13 pgs.
"U.S. Appl. No. 12/234,439, Response filed Oct. 24, 2011 to Final Office Action dated Jun. 22, 2011", 10 pgs.
"U.S. Appl. No. 12/234,439, Response filed Oct. 22, 2012 to Final Office Action dated Jun. 22, 2012", 12 pgs.

(56) References Cited

OTHER PUBLICATIONS

"U.S. Appl. No. 12/234,404. Response filed Jan. 4, 2013 to Non Final Office Action dated Jul. 5, 2012", 11 pgs.

* cited by examiner

ITEM MATCHING

CROSS-REFERENCE TO RELATED APPLICATIONS

This application is a continuation of U.S. patent application Ser. No. 12/234,439, filed on Sep. 19, 2008, entitled "ITEM MATCHING," which is incorporated herein by reference in its entirety.

This application is related to U.S. patent application Ser. No. 12/234,377, filed on Sep. 19, 2008, entitled "TEXT CONVERSION" and U.S. patent application Ser. No. 12/234,404, filed on Sep. 19, 2008, entitled "ITEM CLUSTERING," the contents of which are incorporated by reference in their entirety.

BACKGROUND

Users may seek information about items that is stored in various locations by performing a search query. Queries for items using free-form text may not provide a user with desired results.

BRIEF DESCRIPTION OF THE DRAWINGS

Some embodiments are illustrated by way of example and not limitation in the figures of the accompanying drawings in which.

DETAILED DESCRIPTION

Example methods and systems for item matching are described. In the following description, for purposes of explanation, numerous specific details are set forth in order to provide a thorough understanding of example embodiments. It will be evident, however, to one of ordinary skill in the art that embodiment of the present invention may be practiced without these specific details.

In an example embodiment, free form search inquiries may be converted to compatibility-based search inquiries. The compatibility-based search inquiries may be processed to provide more relevant search results than corresponding free form search inquiries would provide.

In an example embodiment, clustering may be used to record interoperability of one or more items with a parent item. For example, the interoperability may identify car parts that can be used with particular cars and/or which cars can use various parts, computer peripherals that may be used with particular computer systems and/or the computer systems that may work with particular computer peripherals.

In an example embodiment, item matching may be used to locate items (e.g., parts or accessories) that will work with (e.g., fit) a particular parent item.

In an example embodiment, the method 200 may be used to identify additional items that may be of interest to a user based on items currently included in an electronic shopping basket.

Figure 1:
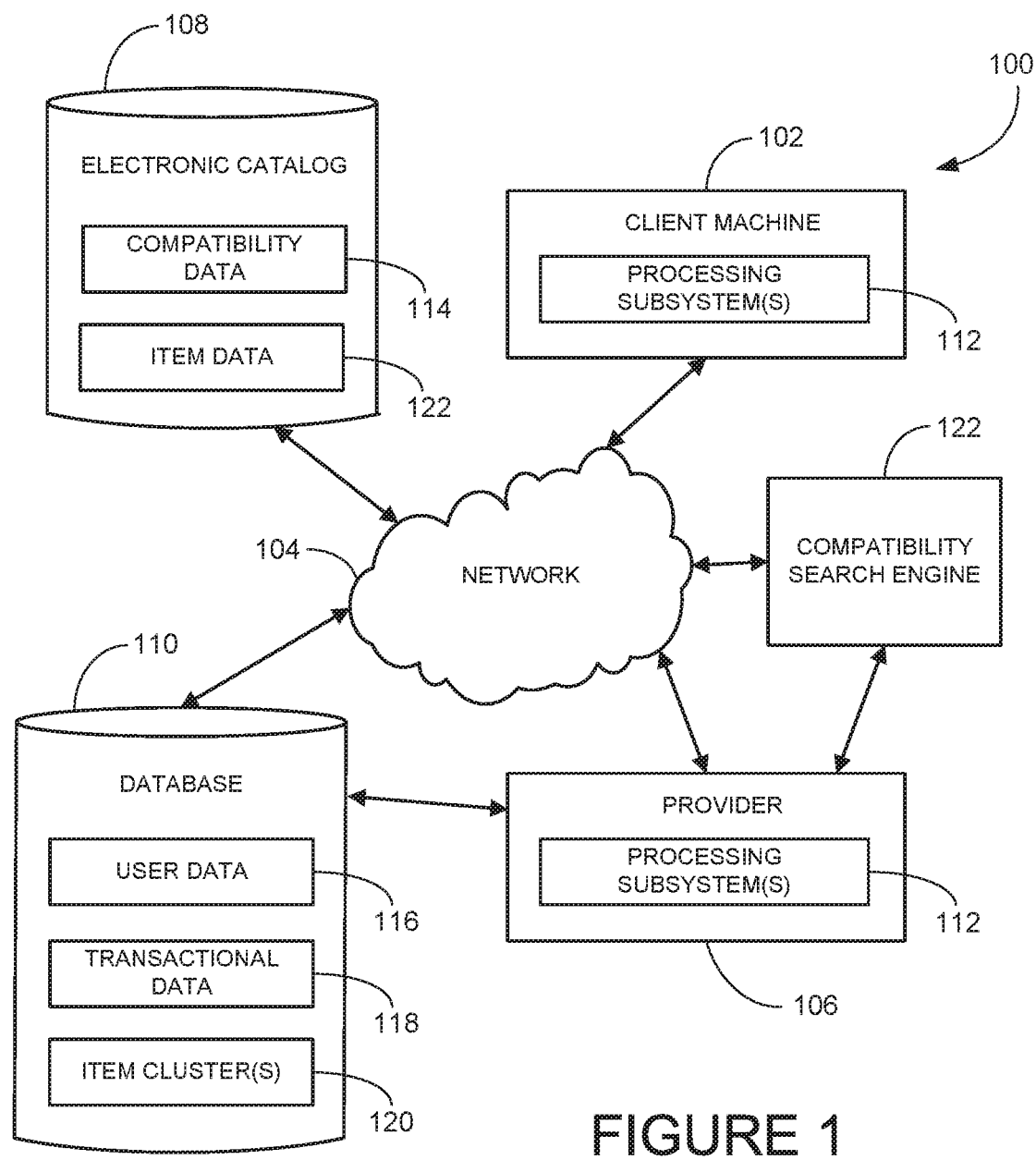
FIG. 1 is a block diagram of a system, according to example embodiments.

FIG. 1 illustrates an example system 100 in which a client machine 102 may be in communication with a provider 106 over a network 104. A user may operate the client machine 102 to communicate with the provider 106 to search for items associated with other users of the provider 106. Examples of the client machine 102 include a set-top box (STB), a receiver card, a mobile telephone, a personal digital assistant (PDA), a display device, a portable gaming unit, or another type of computing system. However, other devices may also be used.

The network 104 over which the client machine 102 and the provider 106 communicate may include a Global System for Mobile Communications (GSM) network, an Internet Protocol (IP) network, a Wireless Application Protocol (WAP) network, a WiFi network, or a IEEE 802.11 standards network as well as various combinations thereof. Other conventional and/or later developed wired and wireless networks may also be used.

The provider 106 may operate on a computer system maintained or controlled by a business entity. For example, the provider 106 may be maintained by PayPal, Inc. of San Jose, Calif.

An electronic catalog 108 may be used by the client machine 102 and/or the provider 106 to access information. The electronic catalog 108 may include compatibility data 114 and item data 122. The compatibility data 114 may include information regarding the fit or interface between an item and another item. For example, the compatibility data 114 may include parent items (e.g., car models) with which an item (e.g., a particular type of engine) is compatible. The item data 122 may include information regarding items available in the electronic catalog 108. For example, the item data 122 may include specifications of available items.

The electronic catalog 108 may include a parts catalog (e.g., for a car or a computer), a merchandise catalog, and/or a different type of catalog. The electronic catalog 108 may be stored in a separate device, within a storage unit of the client machine 102, in the database 110 of the provider 106, or may be otherwise stored.

The client machine 102 and/or the provider 106 may also be in communication with a database 108. The database 110 may store user data 116, transaction data 118, and/or one or more item clusters 120. The user data 116 may include information regarding users of the provider 106. The transactional data 118 may include information regarding transactions conducted by the provider 106. For example, the sale of an item from one user to another may be stored in the transactional data 116.

One or more processing subsystems 112 may be deployed in the client machine 102 and/or the provider 106 to construct compatibility-based text for an item, to create an item cluster for one or more items that associated with a compatibility identifier for a parent item, to identify a number of matching items through use of a compatibility identifier, and/or identify a non-included item in a shopping basket.

A compatibility search engine 122 may communicate with the client machine 102 and/or the provider 106 to receive a request for compatibility verification, determine that an item is compatible with a parent item and provide compatibility verification in response.

Figure 2:
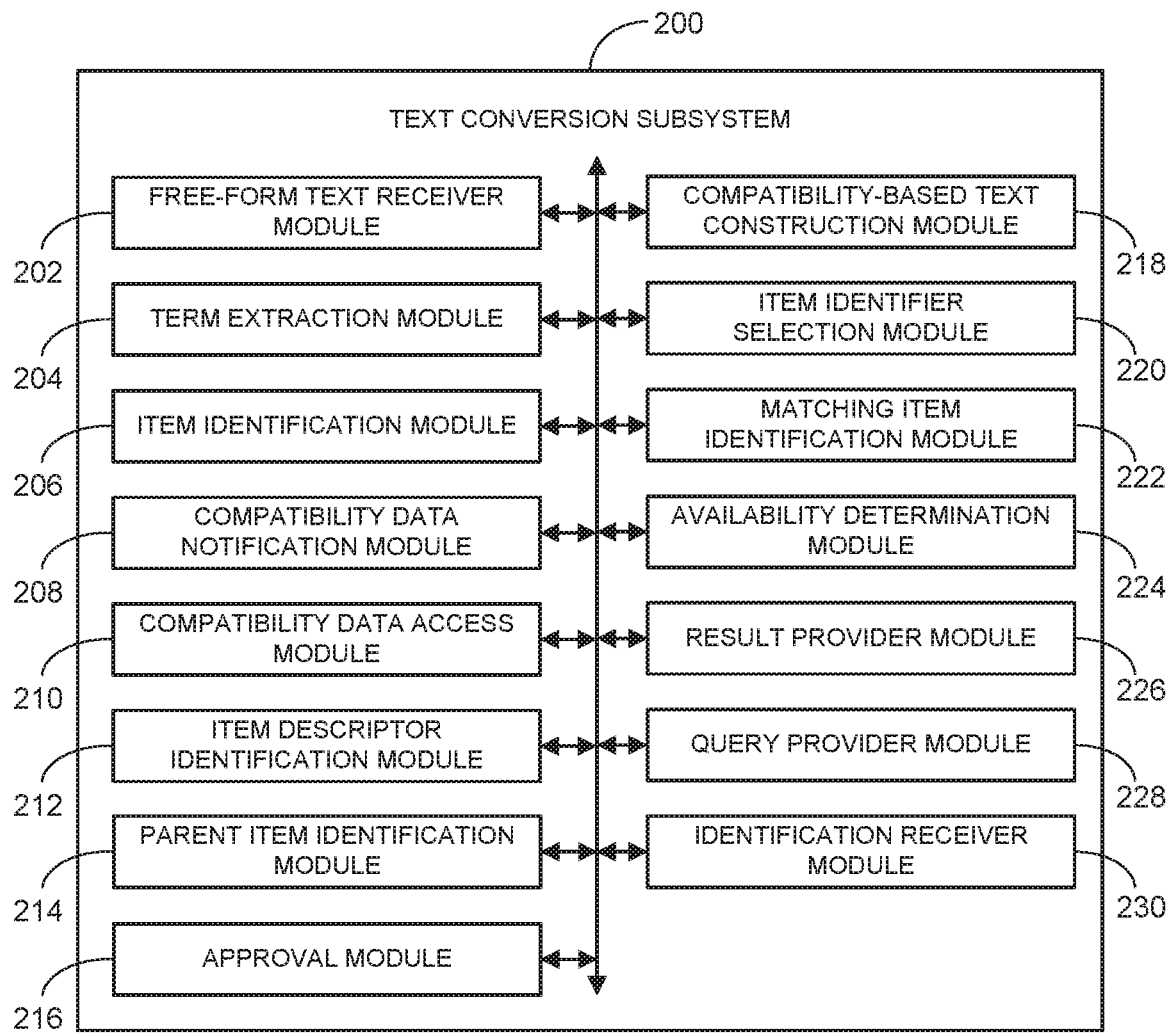
FIG. 2 is a block diagram of a query conversion subsystem that may be deployed within the system of FIG. 1, according to an example embodiment.

FIG. 2 illustrates an example text conversion subsystem 200 that may be deployed as the processing subsystem 112 in the client machine 102 and/or the provider 106 of the system 100 (see FIG. 1), or that may be otherwise deployed in another system. The text conversion subsystem 200 may include a free-form text receiver module 202, a term extraction module 204, an item identification module 206, a compatibility data notification module 208, a compatibility data access module 210, an item descriptor identification module 212, a parent item identification module 214, an approval module 216, a compatibility-based text construction module 218, an item identifier selection module 220, a matching item identification module 222, an availability determination module 224, a result provider module 226, a query provider module 228, and/or an identification receiver module 230. Other modules may also be included. In various embodiments, the modules may be distributed so that some of the modules may be deployed in the client machine 102 and some of the modules may be deployed in the provider 106.

The free-form text receiver module 202 receives free-form text associated with an item. The item may be compatible with a parent item. The item may, in an example embodiment, be a part of the parent item. The term extraction module 204 extracts one or more terms from the free-form search query.

The item identification module 206 identifies the item based on free-form text, extraction of the terms and/or an item identifier. The item identification module 206 may identify an item name of an item. The item name may be among the one or more terms.

The compatibility data notification module 208 provides a compatibility-based notification of availability of a compatibility-based text for the item based on availability of the compatibility data 114. The compatibility data access module 210 accesses the compatibility data 114 for available compatibility-based search queries. The item and the parent item may be associated together within the compatibility data 114.

The item descriptor identification module 212 identifies an item descriptor in the free-form search text. The identification of the item may be based on the free-form text, extraction of the terms and/or access of the compatibility data 114. The item descriptor may be a term of the extracted terms. The item descriptor may be, by way of example, a make, a model year, an engine type, a part number, or the like.

The parent item identification module 214 identifies a parent item. The parent item may be identified by the parent item identification module 214 from the free-form text. The parent item may be identified by the parent item identification module 214 from extraction of one or more terms. The parent item may be identified by the parent item identification module 214 by requesting identification of the parent item and receiving identification of the parent item. The parent item may be otherwise identified by the parent item identification module 214. The approval module 216 provides an approval request to a user based on identification of the item and receives an approval response from the user.

The compatibility-based text construction module 218 constructs compatibility-based text for an item based on a parent item, identification of an item descriptor, identification of the item, receipt of the approval request, and/or availability of the item cluster 120 for the item. The compatibility-based text may be a compatibility-base search query used to search for one or more matching items.

The item identifier selection module 220 selects one or more item identifiers based on a compatibility-based search query. The matching item identification module 222 identifies one or more matching items based on a compatibility-based search query and/or selection one or more the item identifiers.

The availability determination module 224 determines availability of one or more matching items. The result provider module 226 provides a result based on identification and/or availability of one or more matching items. The result may include one or more of the matching items. The matching items may be, in an example embodiment, compatible parts for the parent item.

The query provider module 228 provides a compatibility-based search query for an item to the compatibility search engine 122. The identification receiver module 230 receives identification of the one or more matching items from the compatibility search engine 122.

Figure 3:
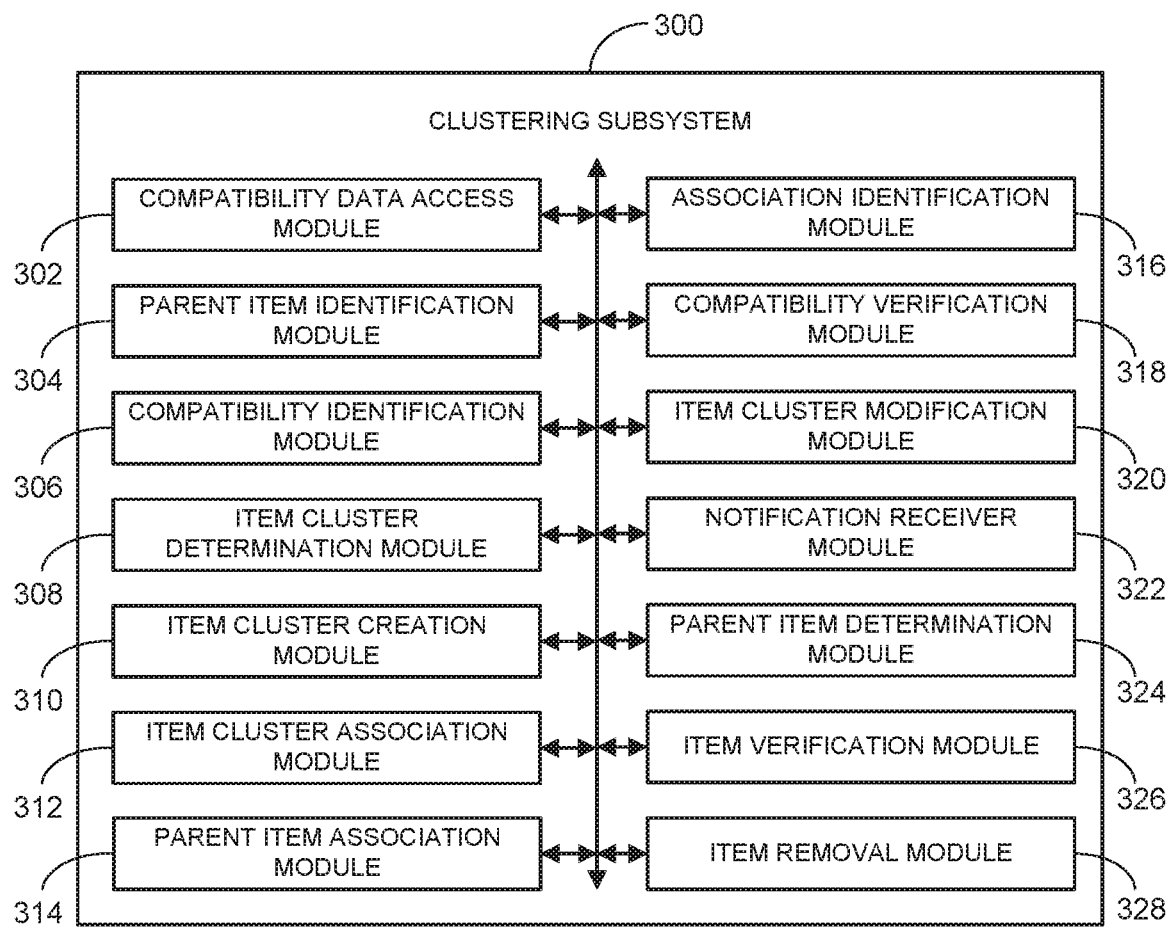
FIG. 3 is a block diagram of a clustering subsystem that may be deployed within the system of FIG. 1, according to an example embodiment.

FIG. 3 illustrates an example clustering subsystem 300 that may be deployed may be deployed as the processing subsystem 112 in the client machine 102 and/or the provider 106 of the system 100 (see FIG. 1), or that may be otherwise deployed in another system. The clustering subsystem 300 may include a compatibility data access module 302, a parent item identification module 304, a compatibility identification module 306, an item cluster determination module 308, an item cluster creation module 310, an item cluster association module 312, a parent item association module 314, an association identification module 316, a compatibility verification module 318, an item cluster modification module 320, a notification receiver module 322, a parent item determination module 324, an item verification module 326, and/or an item removal module 328. Other modules may also be included. In various embodiments, the modules may be distributed so that some of the modules may be deployed in the client machine 102 and some of the modules may be deployed in the provider 106.

A compatibility data access module 302 accesses the compatibility data 114 for an item and/or accesses additional compatibility data 114 for a further item. The parent item identification module 304 identifies a particular parent item within the compatibility data 114 and/or identifies an additional parent item within the compatibility data 114.

The compatibility identification module 306 identifies compatibility of the item and the additional item with the particular parent item from the compatibility data 114 and/or the additional parent item from the compatibility data 114.

The item cluster determination module 308 determines existence or absence of the item cluster 120 for the item and the additional item. The item cluster creation module 310 creates the item cluster 120 for the item and an additional item based on compatibility of the item and the additional item with the particular parent item from the compatibility data 114, identification of the compatibility and/or absence of the item cluster.

The item cluster association module 312 associates a compatibility identifier (e.g., a token) with the item cluster 120 and/or associates the compatibility identifier with the additional parent item. The association of the compatibility identifier with the additional parent item may be based on the existence of the item cluster 120.

The parent item association module 314 associates the compatibility identifier with the parent item. The association identification module 316 identifies an additional parent item associated with the compatibility identifier.

The compatibility verification module 318 verifies that the further item is compatible with the additional parent item. The item cluster modification module 320 modifies the item cluster 120 for the item and the additional item based on compatibility of the item, the additional item, and the further item with the particular parent item and/or verification that the further item is compatible with the additional parent item.

The notification receiver module 322 receives an incompatibility notification regarding the item and the parent item. The parent item determination module 324 determines whether n additional parent item is associated with the compatibility identifier.

The item verification module 326 verifies that the item is incompatible with the additional parent item. The item removal module 328 removes the item from the item cluster 120 based on the receiving of the incompatibility notification and/or the verification of incompatibility.

Figure 4:
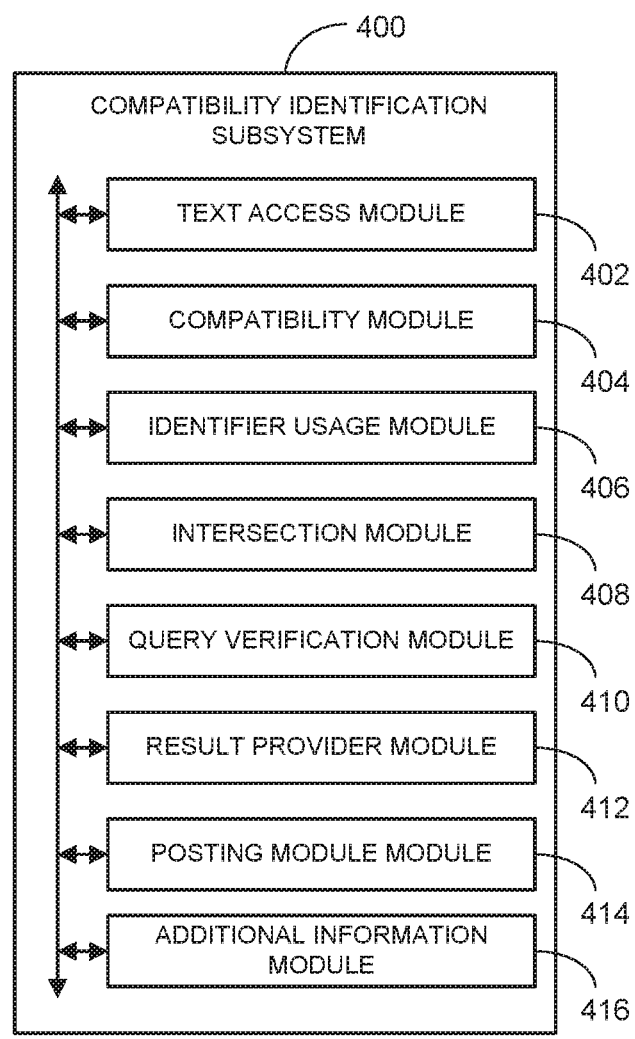
FIG. 4 is a block diagram of a compatibility identification subsystem that may be deployed within the system of FIG. 1, according to an example embodiment.

FIG. 4 illustrates an example compatibility identification subsystem 400 that may be deployed as the processing subsystem 112 in the client machine 102 and/or the provider 106 of the system 100 (see FIG. 1), or that may be otherwise deployed in another system. The compatibility identification subsystem 400 may include a text access module 402, a compatibility identification module 404, an identifier usage module 406, an intersection module 408, a query verification module 410, a result provider module 412, a posting module 414, and/or an additional information module 416. Other modules may also be included. In various embodiments, the modules may be distributed so that some of the modules may be deployed in the client machine 102 and some of the modules may be deployed in the provider 106.

The text access module 402 accesses compatibility-based text for an item and/or additional compatibility-based text for the item. The compatibility-based text may be a compatibility-based search query, a compatibility-based listing, or the like.

The compatibility identification module 404 identifies a compatibility identifier based on the compatibility-based text and/or identifies an additional compatibility identifier based on the compatibility-based text and/or the additional compatibility-based text. The compatibility identifier may be associated with the item cluster 120. The additional compatibility identifier may be associated with an additional item cluster 120.

The identifier usage module 406 uses the compatibility identifier to identify matching items and/or uses the additional compatibility identifier to identify additional matching items. The intersection module 408 intersects the matching items with the additional matching items to obtain a matching result.

The query verification module 410 verifies the compatibility-based search query based on identification of the matching items.

The result provider module 412 provides a result based on identification of the matching items, intersection performed by the intersection module 408, and/or verification of the compatibility-based search query. Providing the result may include modifying a listing for the item based on identification of the matching items. The listing may include the compatibility-based text. The posting module 414 posts the modified listing of the item. For example, the listing may be posted in an online commerce system that sells items at a fixed fee, via auction, or otherwise makes items available for sale.

The additional information module 416 receives a selection of a matching item based on the providing of the result, accesses the additional information on the matching item (e.g., from the electronic catalog 108), and provides additional information on the matching item.

Figure 5:
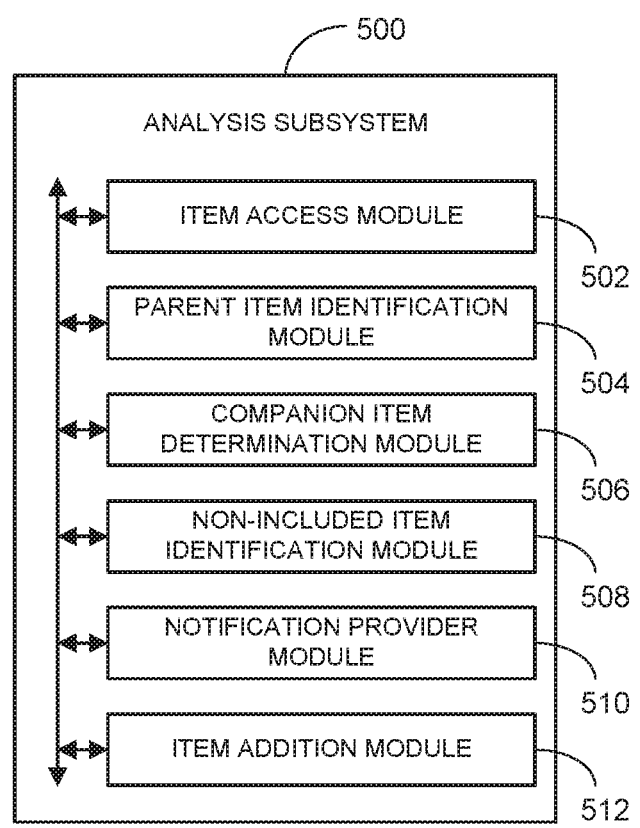
FIG. 5 is a block diagram of an analysis subsystem that may be deployed within the system of FIG. 1, according to an example embodiment.

FIG. 5 illustrates an example analysis subsystem 500 that may be deployed as the processing subsystem 112 in the client machine 102 and/or the provider 106 of the system 100 (see FIG. 1), or otherwise deployed in another system. The analysis subsystem 500 may include an item access module 502, a parent item identification module 504, a companion item determination module 506, a non-included item identification module 508, a notification provider module 510, and/or the item addition module 512. Other modules may also be included. In various embodiments, the modules may be distributed so that some of the modules may be deployed in the client machine 102 and some of the modules may be deployed in the provider 106.

The item access module 502 accesses items in a shopping basket. The parent item identification module 504 identifies a parent item associated with the items.

The companion item determination module 506 determines companion items associated with the parent item. The non-included item identification module 508 identifies a non-included item in the shopping basket based on the accessing of the plurality of items and determining the identity of companion items.

The notification provider module 510 provides a notification based on identification of the non-included item. The item addition module 512 adds the non-included item to the shopping basket.

In an example embodiment, one or more of the subsystems 200, 300, 400, 500 may be deployed as the processing subsystem 112 in the system 100.

Figure 6:
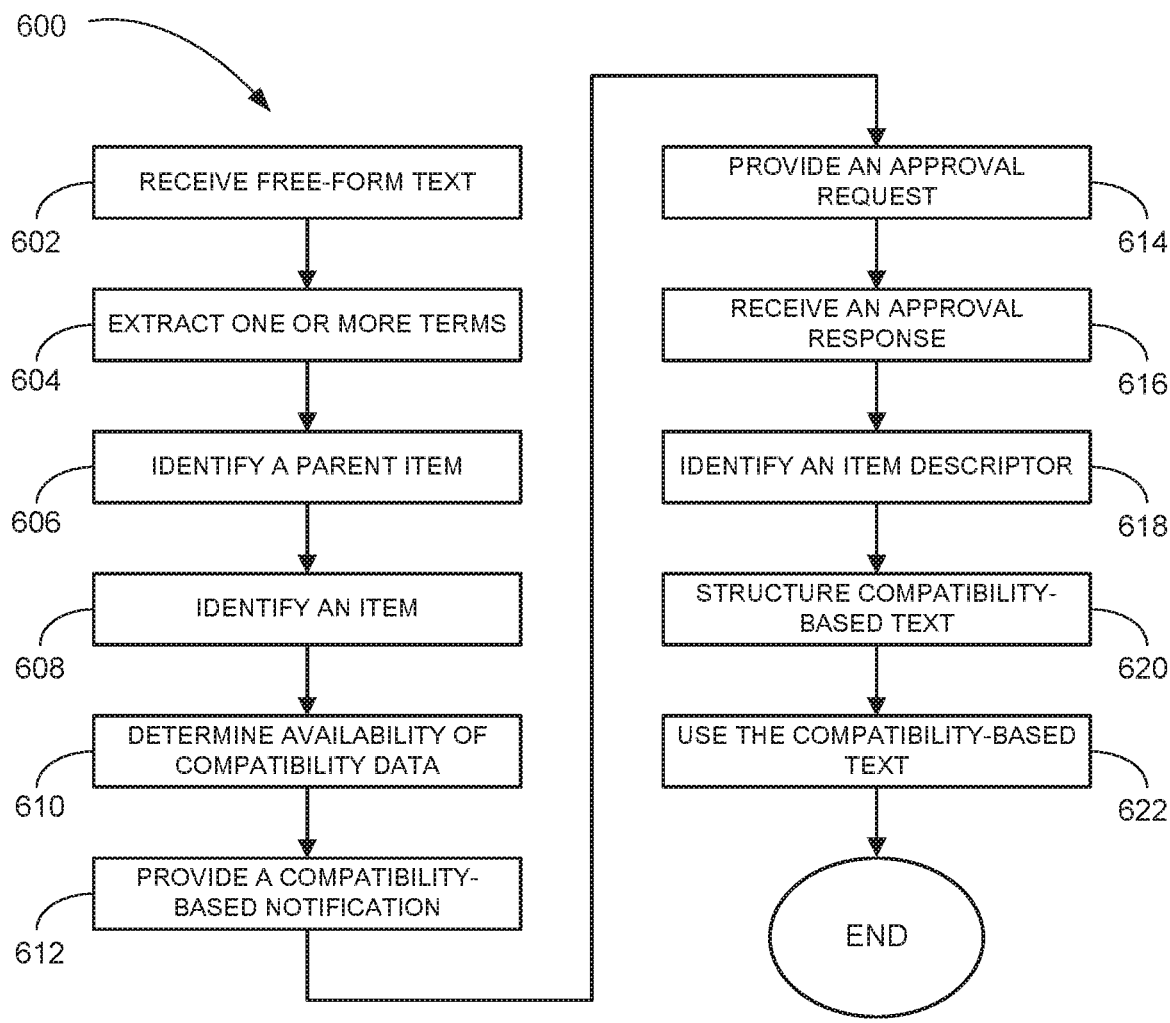
FIG. 6 is an example flowchart illustrating a method for text conversion according to an example embodiment.

FIG. 6 illustrates a method 600 for text conversion according to an example embodiment. The method 600 may be performed by the client machine 102 and/or the provider 106 of the system 100 (see FIG. 1), or may be otherwise performed by another entity.

The method 600 may operate to convert free-form text (e.g., a free-form search query) into compatibility-based text (e.g., a compatibility-based search query). The compatibility-based text may enable a user to receive more accurate results that reflect desired matching items. The matching items may be the exact item requested or compatible with the item requested. For example, a free-form search query for a specific type of MICROSOFT keyboard that includes a particular type of functionality (e.g., wireless connectivity) may be converted into a compatibility-based search query that may be used to return a result of all the keyboards that include the same type of functionality or a comparable type of functionality. For example, a query might be entered as "microsoft wireless keyboard 4000" to search for a MICROSOFT Wireless Laser Desktop 4000 wireless keyboard product and equivalent products.

The conversion of the free-form text into compatibility-based text by the method 600 may increase consumer satisfaction with the results of the search and/or may enhance the likelihood that a product will be sold to the searching user. The method 600 may enable the user to locate a desired item even when the user fails to include a particular keyword in the free-form text (e.g., the user may have entered a specific manufacturer part number instead of the make and model of all the cars in which the part may work).

Free-form text associated with an item is received at block 602. The item may be, by way of example, an accessory for a consumer electronic product (e.g., a remote control), a car part (e.g., a short block of an engine), or the like. Other items may also be used. An example of free-form text includes "2004 Honda break pads". The free-form text may be in the form of a free-form search query or may be in another form. One or more terms are extracted from the free-form text at block 604.

The parent item may be identified at block 606. The parent item is an item with which the item of the text may be used. The item may be a part of the parent item, usable with the parent item, or otherwise associated with the parent item. For example, the item may be a remote control and the parent item may be a television, the item may be an air filter and the parent item may be an engine, or the like.

The parent item may be identified based on extraction of the terms. The parent item may be identified by requesting identification of the parent item and receiving the identification of the parent item. The parent item a be identified otherwise.

At block 608, the item is identified based on extraction of the terms. The item may be compatible with a parent item. In an example embodiment, an item name of the item may be identified during the operations at block 608. The item name may be a term of the free-form text.

A determination of whether compatibility data 114 is available for the item based on identification of the item may be made at block 610. A compatibility-based notification may be provided at block 612. The compatibility-based notification may be provided based on availability of the compatibility data 114.

At block 614, an approval request may be provided to a user based on identification of the item and/or providing of the compatibility-based notification. An approval response may be received from the user at block 616 based on providing the approval request.

At block 618, one or more item descriptors are identified in the free-form text based on the extraction of the terms. The item descriptor may be one or more terms of the free-form text. The item descriptor may be, by way of example, a make, a model year, an engine type, or a part number. For example, if the item is an engine, item descriptors in the free form search may include "volvo" "2006", and/or "turbo".

Compatibility-based text is constructed for the item at block 620 based on the identity of the parent item, identification of the item descriptor, availability of the compatibility data 114 for the item, and/or receiving an approval request. The compatibility-based text may include a compatibility-based search query that is capable of being used to search for matching items. The compatibility-based text may be used at block 622. The compatibility-based text may be used to perform a search, list an item in an online marketplace, or may be otherwise used.

Figure 7:
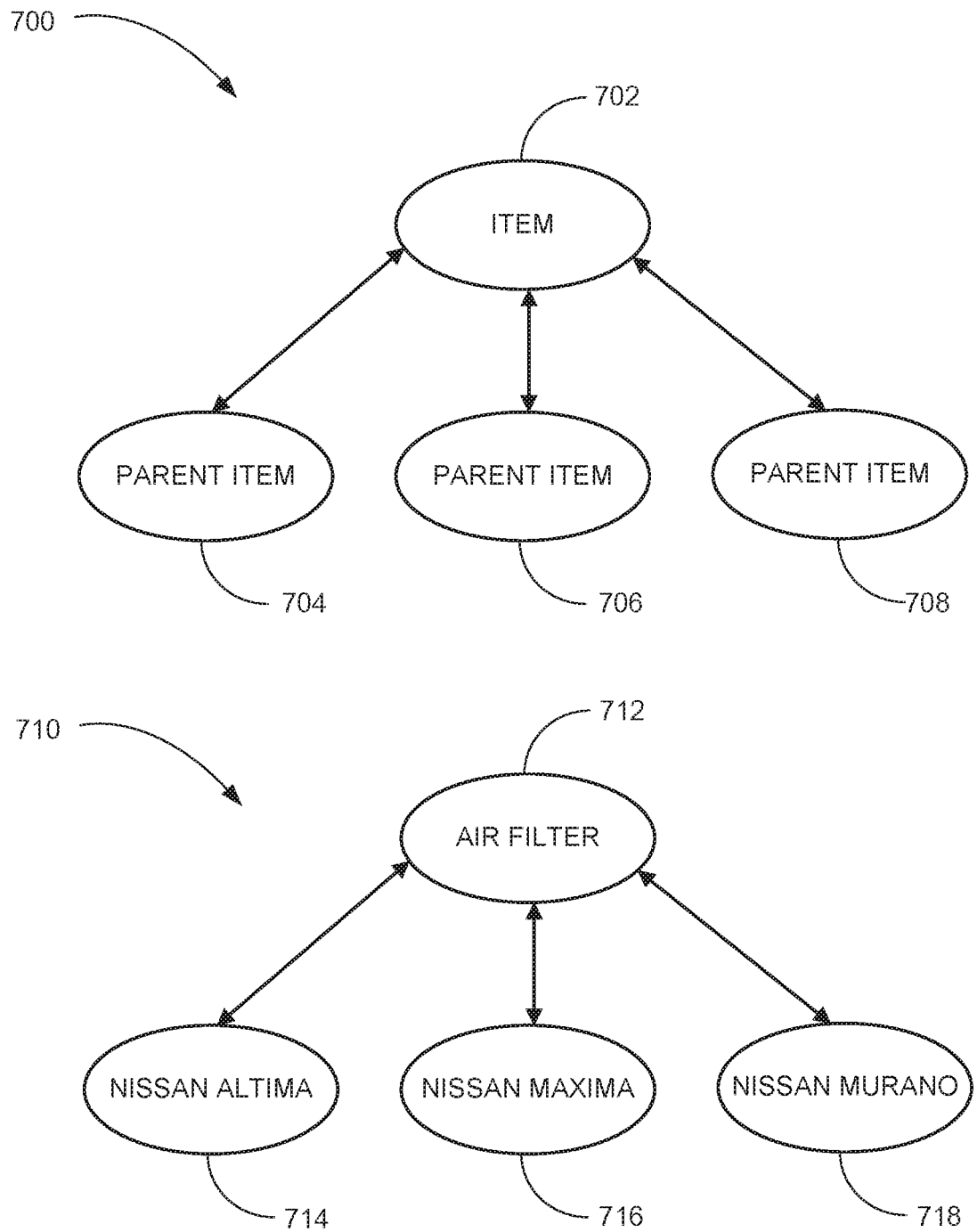
FIG. 7 is a diagram of compatibility data according to an example embodiment.

FIG. 7 is an example diagram of compatibility data 700, 710. The compatibility data 700, 710 may be used as a portion of the compatibility data 114 (see FIG. 1) or may otherwise be used.

The compatibility data 700 illustrates an item 702 associated with three parent items 704, 706, 708. However, more or less parent items may be associated with the item 702. An example of the compatibility data 700 with example data is shown in FIG. 7 as an air filter 710 is associated with three vehicles 714, 716, 718.

The compatibility data 700, 710 may be implemented as a linked association, a listing, or may otherwise be implemented in some form of relational format.

Figure 8:
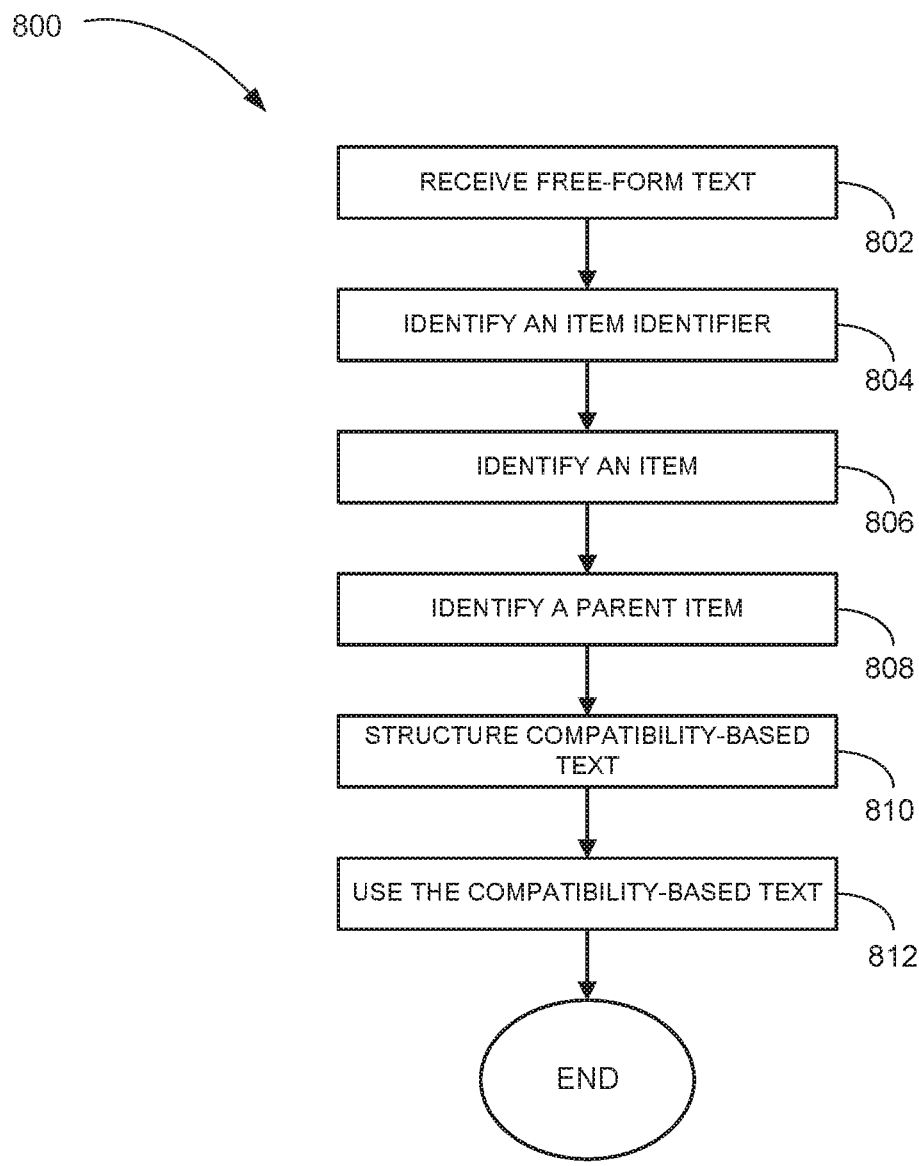
FIG. 8 is an example flowchart illustrating a method for text conversion according to an example embodiment.

FIG. 8 illustrates a method 800 for text conversion according to an example embodiment. The method 800 may be performed by the client machine 102 and/or the provider 106 of the system 100 (see FIG. 1), or may be otherwise performed by another entity.

The method 800 may operate to convert free-form text (e.g., a free-form search query) into compatibility-based text (e.g., a compatibility-based search query). The compatibility-based text may enable a user to receive more accurate results that reflect desired matching items. The matching items may be the exact item requested or compatible with the item requested. For example, a free-form search query for a specific type of MICROSOFT keyboard that includes a particular type of functionality (e.g., wireless connectivity) may be converted into a compatibility-based search query that may be used to return a result of all the keyboards that include the same type of functionality or a comparable type of functionality.

The conversion of the free-form text into compatibility-based text by the method 800 may increase consumer satisfaction with the results of the search and/or may enhance the likelihood that a product will be sold to the searching user. The method 800 may enable the user to locate a desired item even when the user fails to include a particular keyword in the free-form text (e.g., the user may have entered a specific manufacturer part number instead of the make and model of all the cars in which the part may work).

Free-form text associated with an item is received at block 802. An item identifier is identified within the free-form text at block 804. The item is identified based on the item identifier at block 806.

A parent item is identified based on extraction of terms at block 808. The identification of the parent item may include, by way of example, requesting identification of the parent item based on identification of the item and receiving the identification of the parent item.

Compatibility-based text is constructed for the item based on the parent item and identification of the item at block 810. The compatibility-based text may be a compatibility-based query capable of being used to search for matching items. The compatibility-based text may be used at block 812. The compatibility-based text may be used to perform a search, list an item in an online marketplace, or may be otherwise used.

Figure 9:
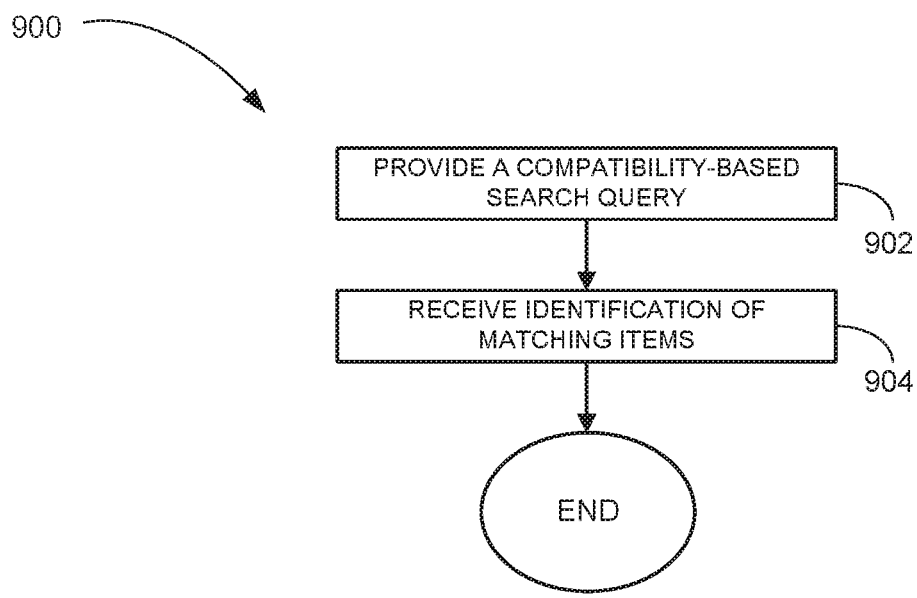
FIGS. 9 and 10 are flowcharts illustrating a method for query usage according to an example embodiment.

FIG. 9 illustrates a method 900 for query usage according to an example embodiment. The method 900 may be performed using information developed by performing the activities shown at block 622 of FIG. 6, and/or block 812 of FIG. 8, or may be performed using other information.

The compatibility-based search query for the item is provided to the compatibility search engine 122 at block 902. Identification of the matching items is received from the compatibility search engine 122 based on providing the compatibility-based search query at block 904.

Figure 10:
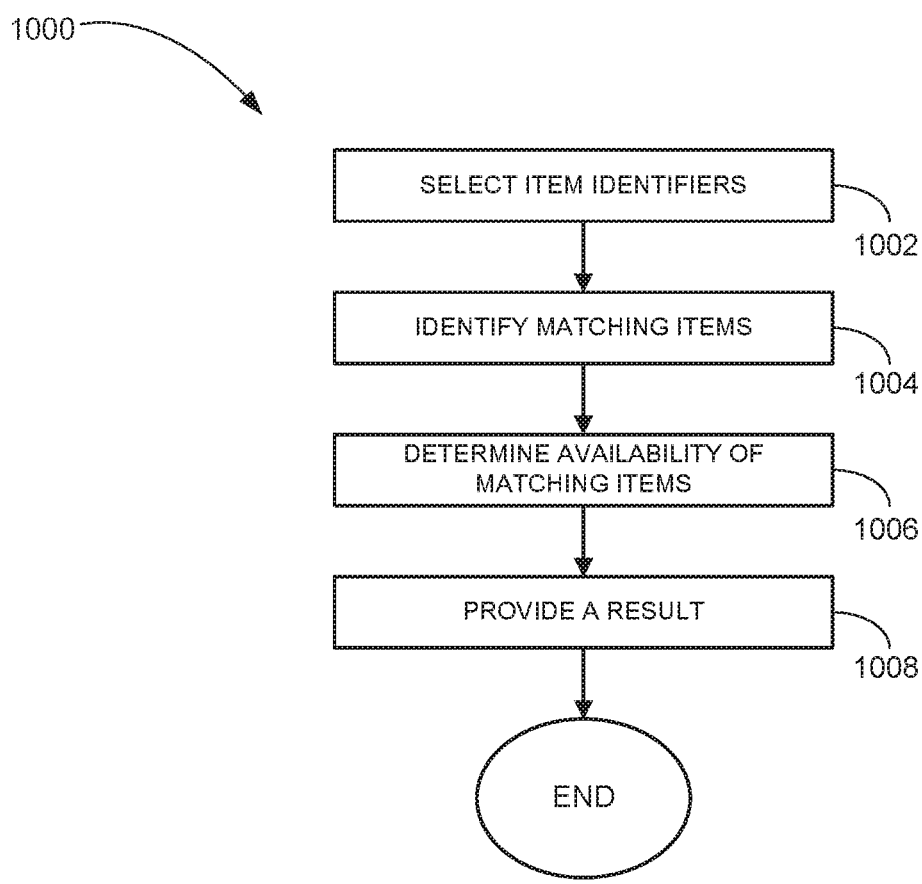

FIG. 10 illustrates a method 1000 for query usage according to an example embodiment. The method 1000 may be performed using information developed by performing the activities shown at block 622 of FIG. 6, and/or block 812 of FIG. 8, or may be performed using other information.

Item identifiers may be selected based on the compatibility-based search query at block 1002. Matching items based are identified at block 1004 based on the compatibility-based search query. Identification of the matching items may be based on selection of the item identifiers. The matching items may be, by way of example, compatible parts for the parent item.

Availability of the matching items may be determined at block 1006. The matching items may be determined by accessing the appropriate item cluster 120 (see FIG. 1).

A query result based on identification of the matching items is provided at block 1008. Providing the query result may be based on the availability of the matching items. The result may include, by way of example, one or more matching items.

Figure 11:
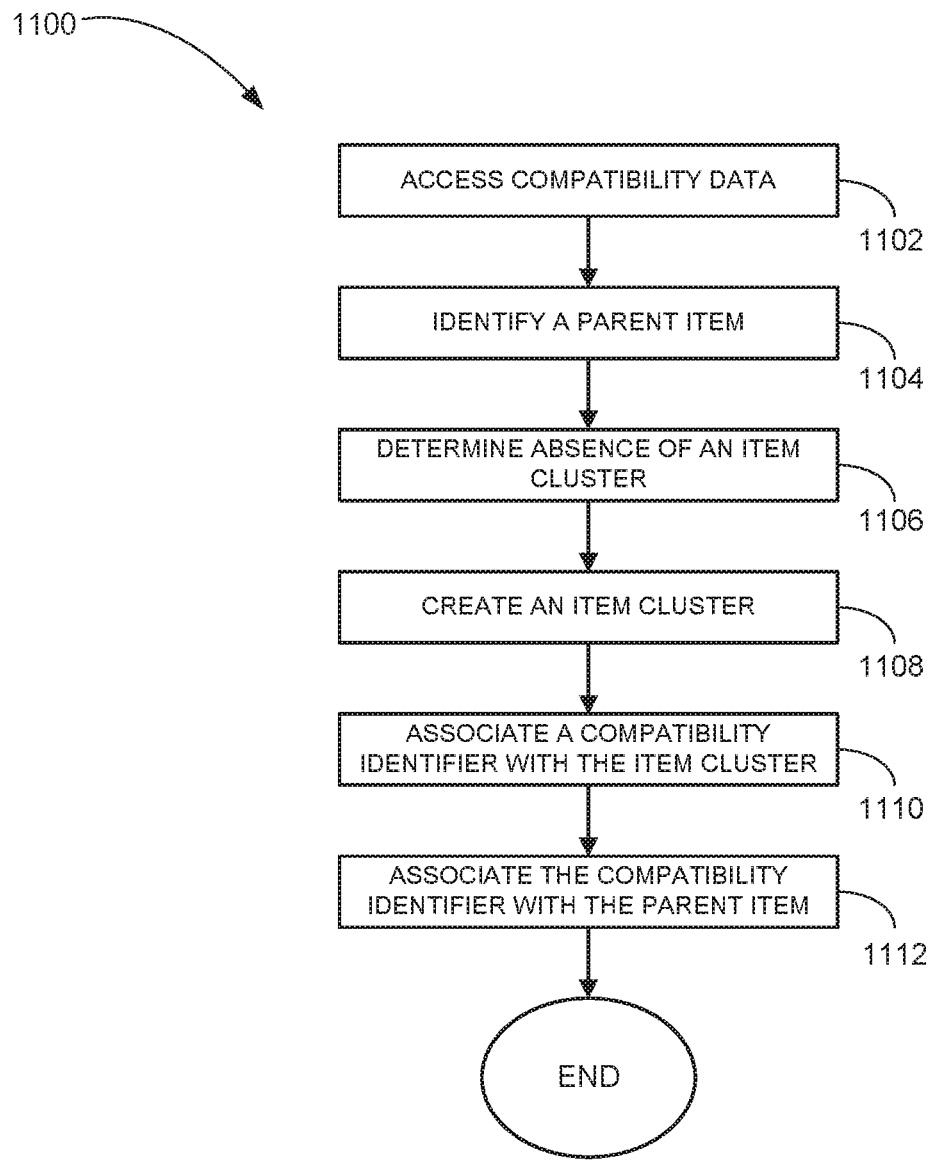
FIG. 11 is a flowchart illustrating a method for clustering according to an example embodiment.

FIG. 11 illustrates a method 1100 for clustering according to an example embodiment. The method 1100 may be performed by the client machine 102 and/or the provider 106 of the system 110 (see FIG. 1), or may be otherwise performed by another entity.

The method 1100 may be used to record interoperability of one or more items with a parent item. For example, the method 1100 may be used to identify the car parts that can be used with particular cars and/or which cars can use various parts, the computer peripherals that may be used with particular computer systems and/or the computer systems that may work with particular computer peripherals, or may be otherwise used.

Compatibility data 114 (see FIG. 1) is accessed for an item at block 1102. The compatibility data 114 may include one or more parent items with which the item is compatible. A particular parent item is identified within the compatibility data at block 1104.

Absence of the item cluster 120 for the item and an additional item may be determined at block 1106. At block 1108, an item cluster is created for the item and an additional item based on compatibility of the item and the additional item with the particular parent item. The compatibility may be reflected in the compatibility data 114. The creation of the item cluster may be based on the absence of the item cluster.

A compatibility identifier is associated with the item cluster at block 1110. The compatibility identifier is associated with the parent item at block 1112.

Figure 12:
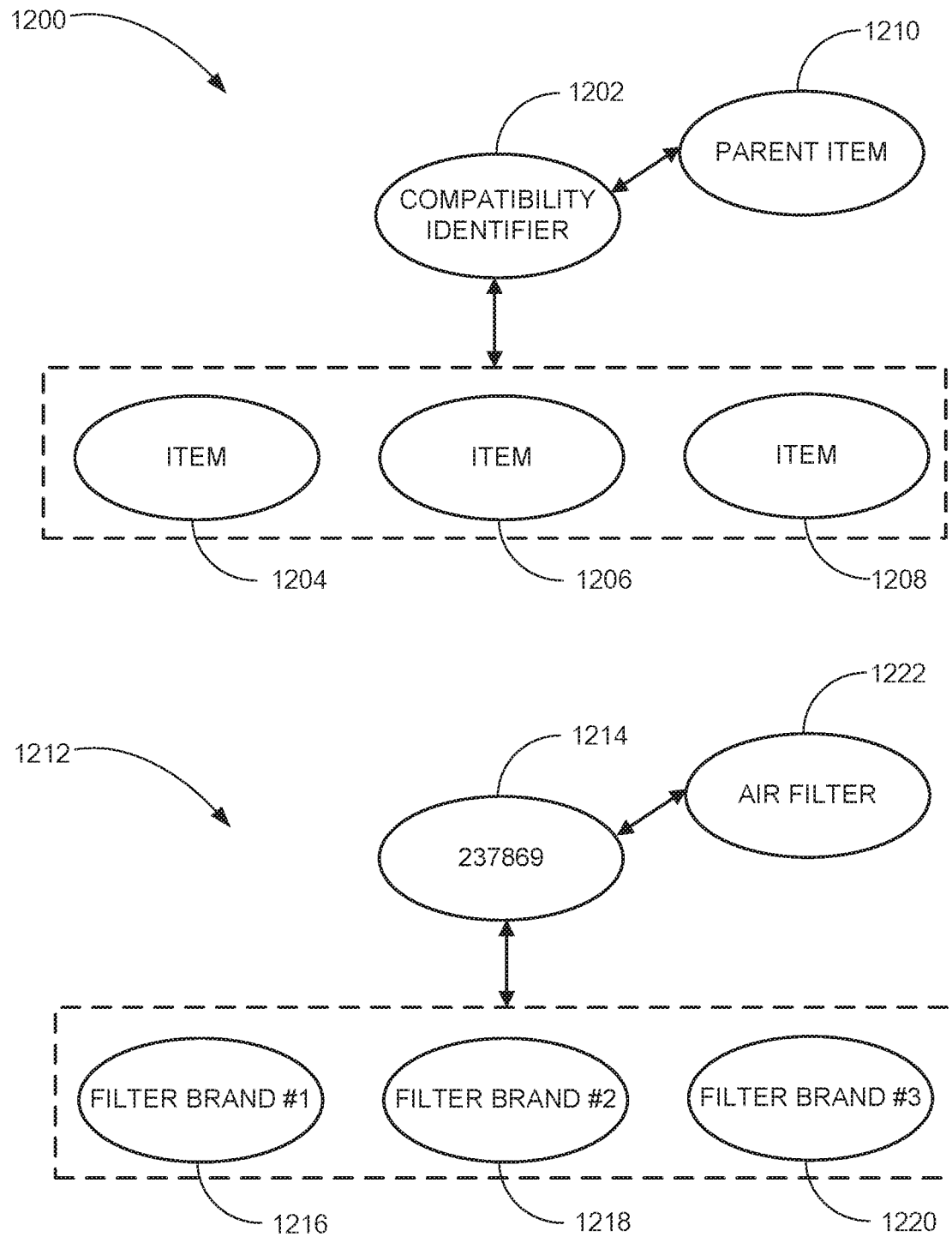
FIG. 12 is a diagram of item clusters according to an example embodiment.

FIG. 12 is an example diagram of example item clusters 1200, 1212. The item clusters 1200, 1212 may be used as a portion of the item clusters 120 (see FIG. 1) or may otherwise be used.

The item cluster 1200 illustrates a compatibility identifier 1202 associated with three items 1204, 1206, 1208. However, more or less items may be associated with the compatibility identifier 1202. A single parent item 1210 is associated with the compatibility identifier 1202. However, multiple parent items may be associated with the compatibility identifier 1202.

An example of the item cluster 1200 using example data is shown in FIG. 12. A compatibility identifier 1214 is associated with three filter brands 1216, 1218, 1220. An air filter 1222 is associated with the compatibility identifier 1214 as the parent item 1210.

Figure 13:
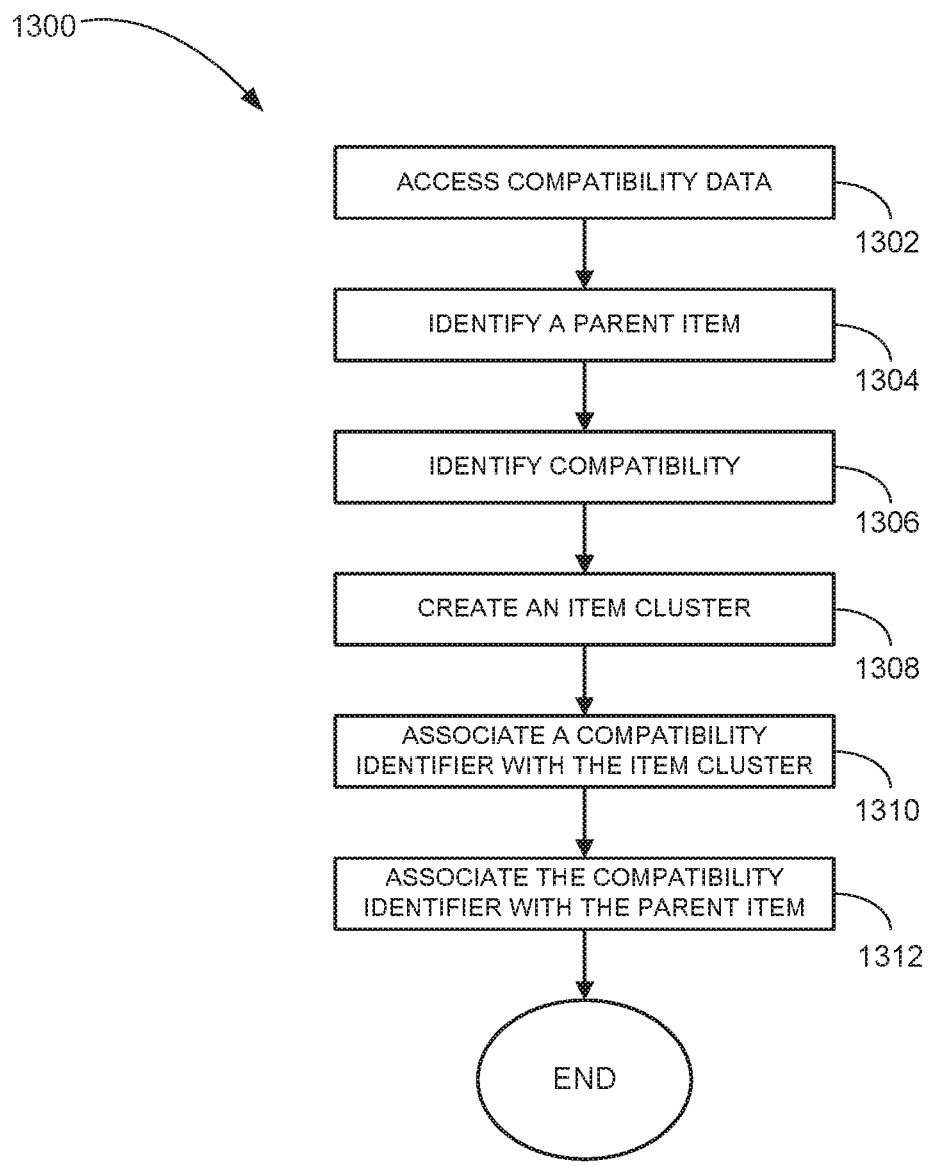
FIGS. 13-16 is a flowchart illustrating a method for clustering according to an example embodiment.

FIG. 13 illustrates a method 1300 for clustering according to an example embodiment. The method 1300 may be performed by the client machine 102 and/or the provider 106 of the system 100 (see FIG. 1), or may be otherwise performed by another entity.

The method 1300 may be used to record interoperability of one or more items with a parent item. For example, the method 1300 may be used to identify the car parts that can be used with particular cars and/or which cars can use various parts, the computer peripherals that may be used with particular computer systems and/or the computer systems that may work with particular computer peripherals, or may be otherwise used.

Compatibility data 114 (see FIG. 1) is accessed for an item at block 1302. The compatibility data 114 may include one or more parent items with which the item is compatible. A particular parent item is identified within the compatibility data 114 at block 1304.

Compatibility of the item and the additional item with the particular parent item may be identified from the compatibility data 114 at block 1306. At block 1308, the item cluster 120 is created for the item and an additional item based on compatibility of the item and the additional item with the particular parent item from the compatibility data 114 and/or identification of the compatibility.

A compatibility identifier is associated with the item cluster 120 at block 1310. The compatibility identifier is associated with the parent item at block 1312.

Figure 14:
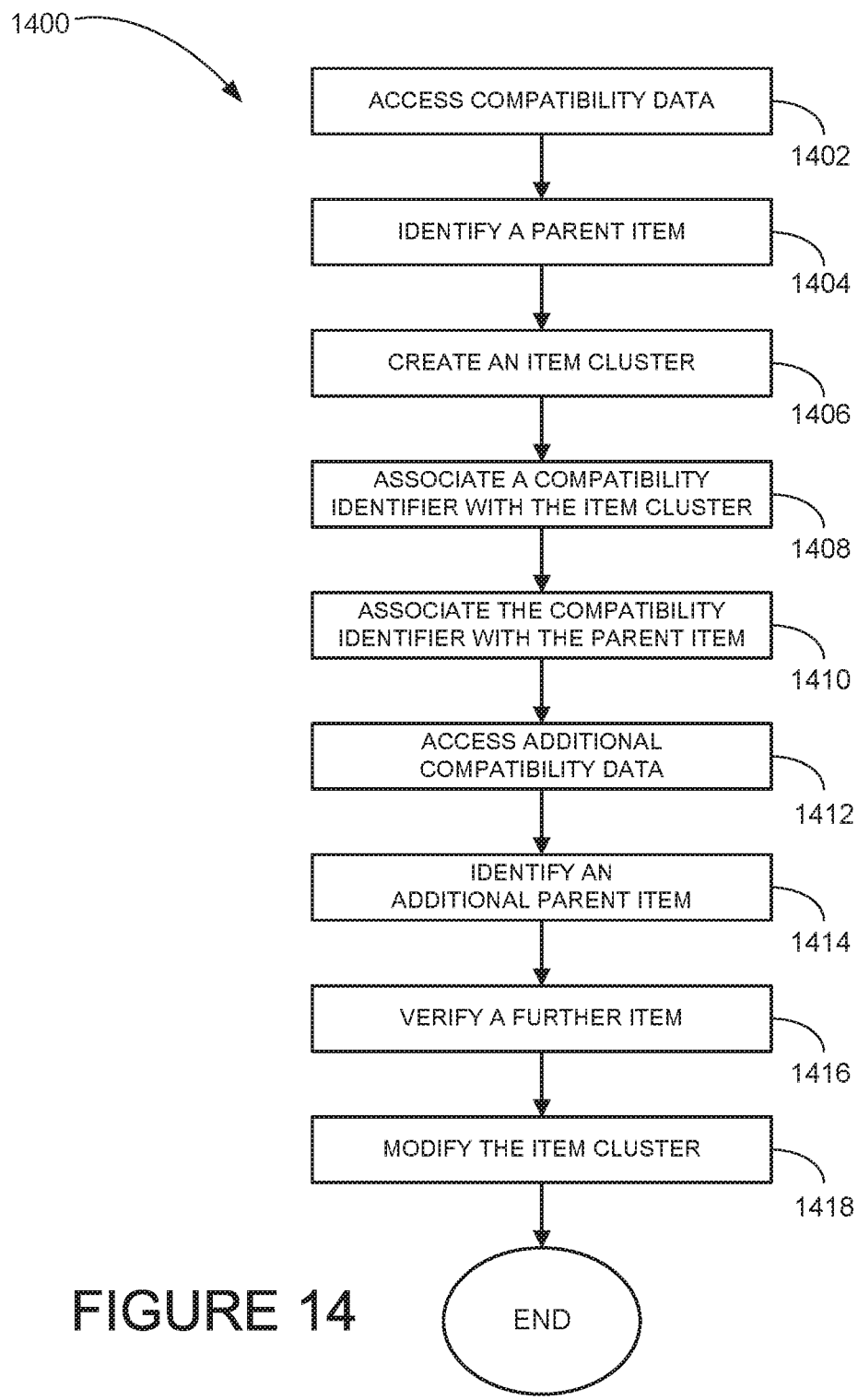

FIG. 14 illustrates a method 1400 for clustering according to an example embodiment. The method 1400 may be performed by the client machine 102 and/or the provider 106 of the system 100 (see FIG. 1), or may be otherwise performed by another entity.

The method 1400 may be used to record interoperability of one or more items with a parent item. For example, the method 1400 may be used to identify the car parts that can be used with particular cars and/or which cars can use various parts, the computer peripherals that may be used with particular computer systems and/or the computer systems that may work with particular computer peripherals, or may be otherwise used.

Compatibility data 114 (see FIG. 1) is accessed for an item at block 1402. The compatibility data 114 may include a list of parent items with which the item is compatible. A particular parent item is identified within the compatibility data 114 at block 1404.

At block 1406, the item cluster 120 (see FIG. 1) is created for the item and an additional item based on compatibility of the item and the additional item with the particular parent item from the compatibility data 114. A compatibility identifier is associated with the item cluster 120 at block 1408. The compatibility identifier is associated with the parent item at block 1410.

Additional compatibility data 114 for a further item is accessed at block 1412. The additional compatibility data 114 may be received from a user or otherwise accessed. An additional parent item associated with the compatibility identifier is identified at block 1414. For example, the additional parent item may be identified as also being compatible with the items of the item cluster 120.

Verification that the further item is compatible with the additional parent item may be performed at block 1416. The verification may include analyzing the additional compatibility data 114 for the further item to verify that the further item is compatible with the additional parent item. The verification may include providing a request for compatibility verification that the further item is compatible with the additional parent item to the compatibility search engine 122 and receiving the compatibility verification in response to the providing of the request.

At block 1418, the item cluster 120 for the item and the additional item may be modified based on compatibility of the item, the additional item, and the further item with the particular parent item and/or verification that the further item is compatible with the additional parent item.

The item cluster may be modified to include the further item to reflect that the further item is also compatible with the parent item. For example, an additional air filter that has the same compatibility as a group of other air filters may be added as a further item to the item cluster 120 for the air filters.

Figure 15:
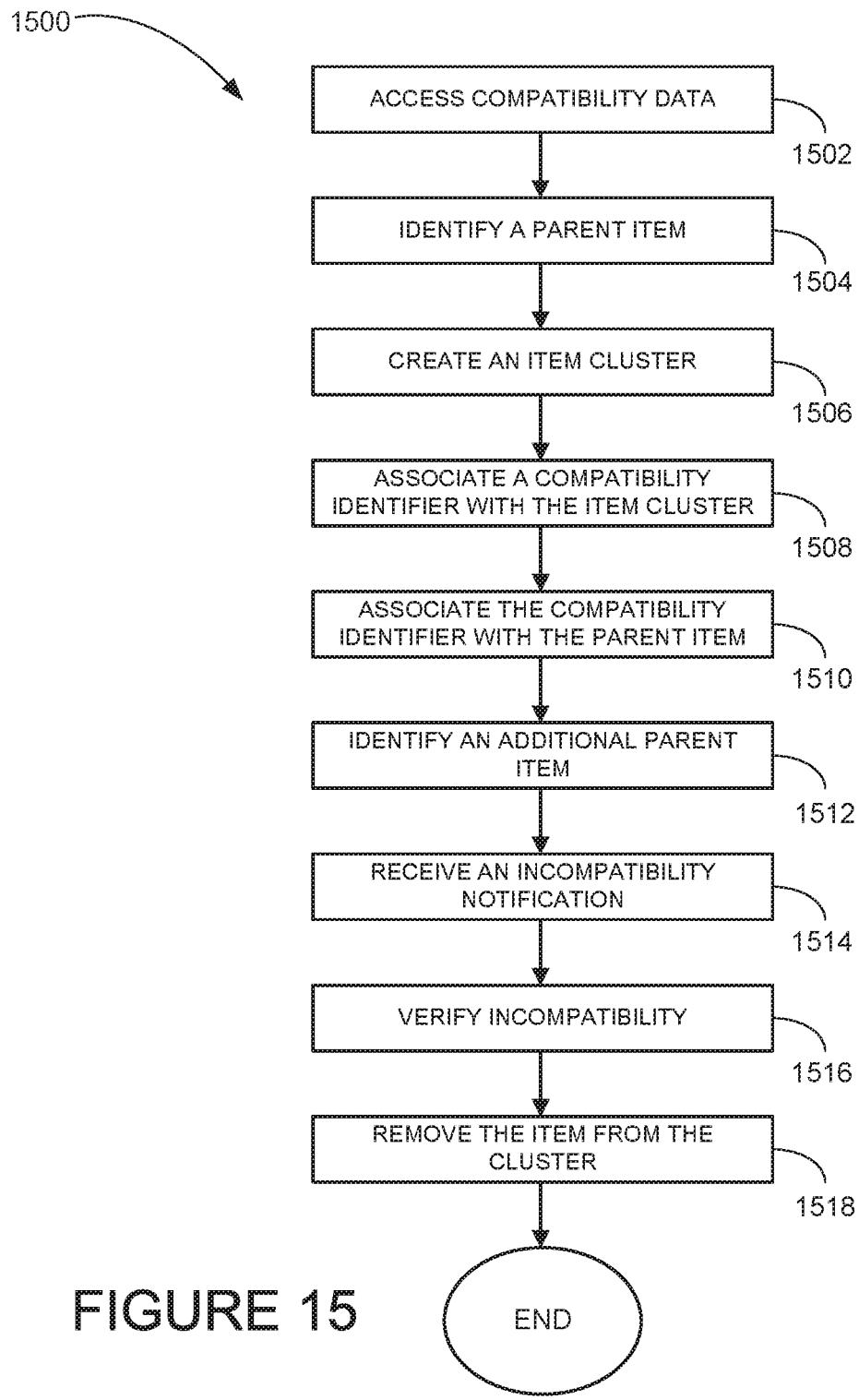

FIG. 15 illustrates a method 1500 for clustering according to an example embodiment. The method 1500 may be performed by the client machine 102 and/or the provider 106 of the system 100 (see FIG. 1) or may be otherwise performed.

The method 1500 may be used, in an example embodiment to remove an incompatible item from the item cluster 120.

Compatibility data 114 (see FIG. 1) is accessed for an item at block 1502. The compatibility data 114 may include one or more parent items with which the item is compatible. A particular parent item is identified within the compatibility data 114 at block 1504.

At block 1506, the item cluster 120 (see FIG. 1) is created for the item and an additional item based on compatibility of the item and the additional item with the particular parent item from the compatibility data 114.

A compatibility identifier is associated with the item cluster 114 at block 1508. The compatibility identifier is associated with the parent item at block 1510.

An additional parent item associated with the compatibility identifier may be identified at block 1512. An incompatibility notification regarding the item and the parent item may be received at block 1514. Verification that the item is incompatible with the additional parent item may be made at block 1516.

The item may be removed from the item cluster 120 based on the receiving of the incompatibility notification and/or the incompatibility verification at block 1518.

Figure 16:
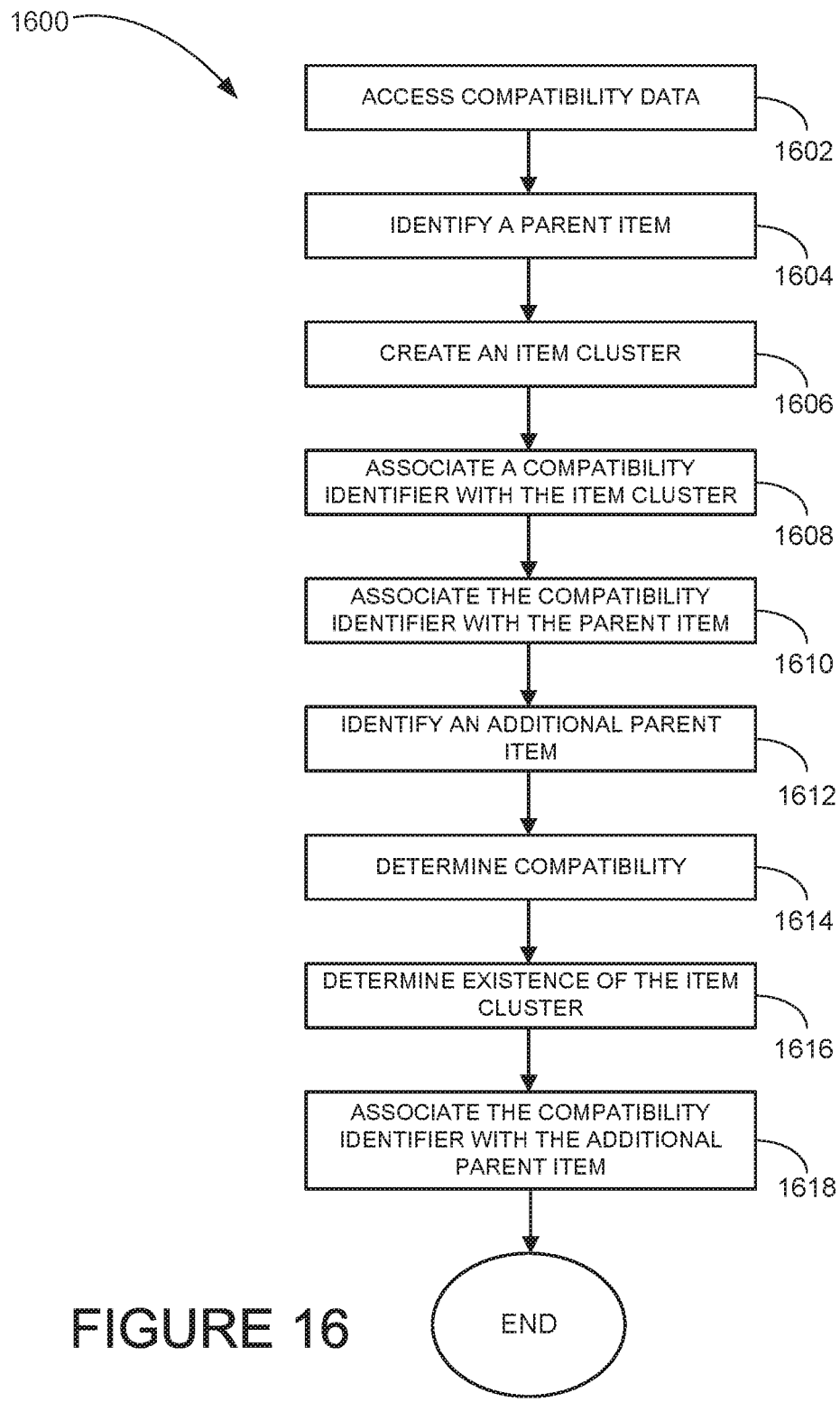

FIG. 16 illustrates a method 1600 for clustering according to an example embodiment. The method 1600 may be performed by the client machine 102 and/or the provider 106 of the system 100 (see FIG. 1), or may be otherwise performed by another entity.

The method 1600 may be used to record interoperability of one or more items with a parent item. For example, the method 1600 may be used to identify the car parts that can be used with particular cars and/or which cars can use various parts, the computer peripherals that may be used with particular computer systems and/or the computer systems that may work with particular computer peripherals, or may be otherwise used.

Compatibility data 114 (see FIG. 1) is accessed for an item at block 1602. The compatibility data 114 may include parent items with which the item is compatible. A particular parent item is identified on the compatibility data 114 at block 1604.

At block 1606, the item cluster 120 (see FIG. 1) is created for the item and an additional item based on compatibility of the item and the additional item with the particular parent item from the compatibility data 114.

A compatibility identifier is associated with the item cluster 120 at block 1608. The compatibility identifier is associated with the parent item at block 1610.

An additional parent item may be identified on the compatibility listing at block 1612. Compatibility of the item and the additional item with the additional parent item may be determined from the item listing at block 1614.

Existence of the item cluster 114 for the item and the additional item may be determined at block 1616. The compatibility identifier may be associated with the additional parent item at block 1618. The association of the compatibility identifier with the additional parent item may be based on the existence of the item cluster 120.

Figure 17:
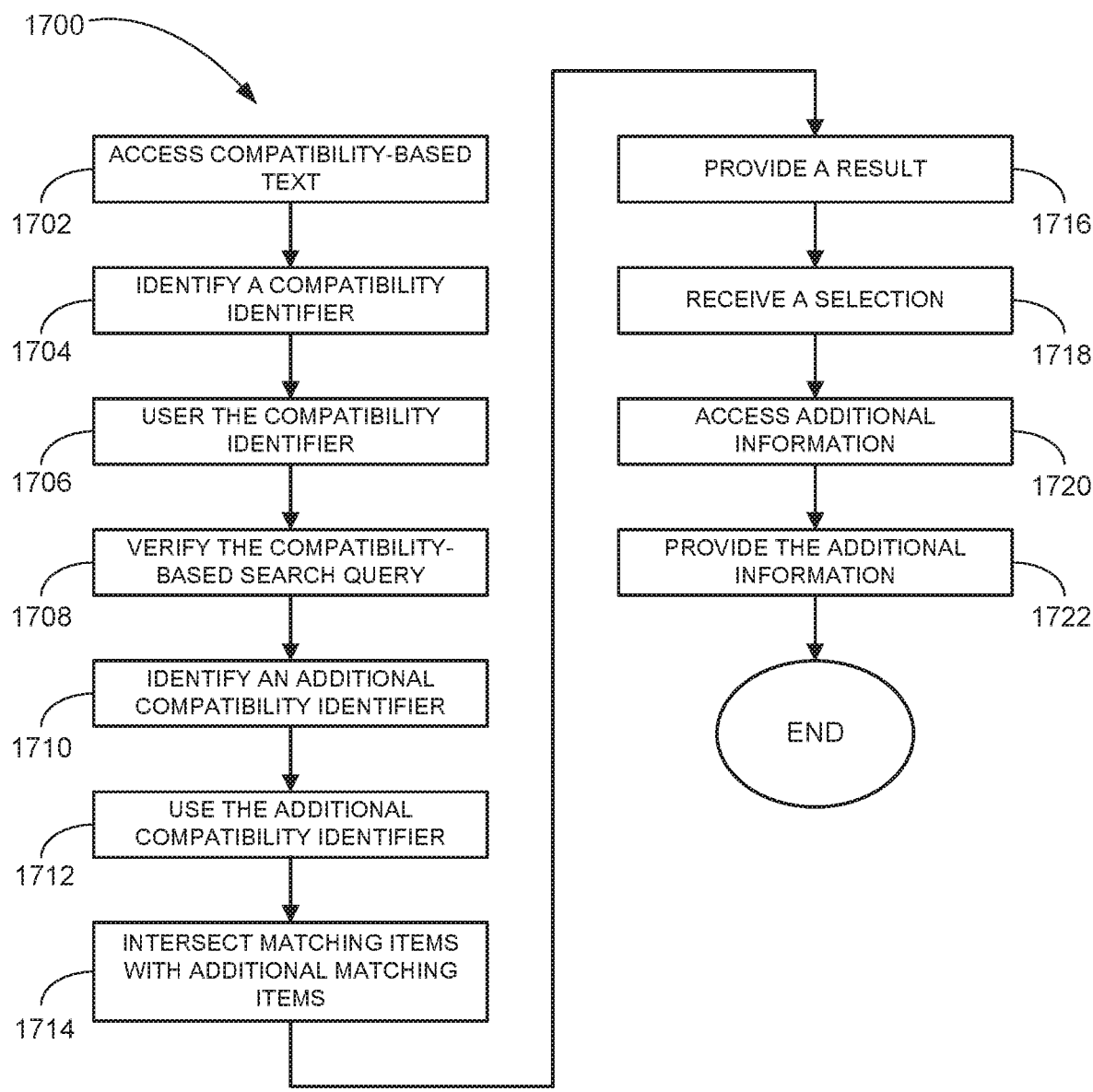
FIGS. 17-19 is a flowchart illustrating a method for compatibility identification according to an example embodiment.

FIG. 17 illustrates a method 1700 for compatibility identification according to an example embodiment. The method 1700 may be performed by the client machine 102 and/or the provider 106 of the system 100 (see FIG. 1), or may be otherwise performed by another entity.

The method 1700 may be used, in an example embodiment, to locate items (e.g., parts or accessories) that will work with (e.g., fit) a particular parent item. The method 1700 may decompress compressed compatibility data 114 by use of a compatibility identifier.

Compatibility-based text is accessed for an item at block 1702. The compatibility-based text may include, by way of example, a compatibility-based search query, a compatibility-based listing, or the like.

A compatibility identifier is identified based on the compatibility-based text at block 1704. The compatibility identifier may be associated with the item cluster 120 (see FIG. 1).

The compatibility identifier is used to identify matching items at block 1706. The compatibility-based search query may be verified based on identification of the matching items at block 1708.

An additional compatibility identifier may be identified based on the compatibility-based text at block 1710. The additional compatibility identifier may be associated with an additional item cluster 120. The additional compatibility identifier may be used to identify additional matching items at block 1712. For example, the compatibility-based text may be used to match more than one item cluster 120. By way of example, the compatibility-based text for the terms "canon digital rebel camera" may be used to match a first item cluster for compatible lens, a second item cluster for compatible flashes, a third item cluster for compatible grips, and so on.

The matching items may be intersected with the additional matching items to obtain a result at block 1714. The intersection may identify items that are common in both sets of matching items. For example, the compatibility-based text for the terms "canon digital camera" may identify a first item cluster that is for items compatible with a point and shoot camera and a second item cluster that is for items compatible with a digital SLR camera. The intersection of the item clusters may reveal items that are compatible with both types of cameras (e.g., tripods).

A result is provided based on identification of the matching items and/or the intersecting at block 1716. Providing the result may be based on verification of the compatibility-based search query.

A selection of a particular matching item of the matching items may be received based on the providing of the result at block 1718. The additional information on the particular matching item may be accessed from the electronic catalog 108 at block 1720.

Additional information on the particular matching item may be provided at block 1722. Providing the additional information may be based on accessing the additional information.

Figure 18:
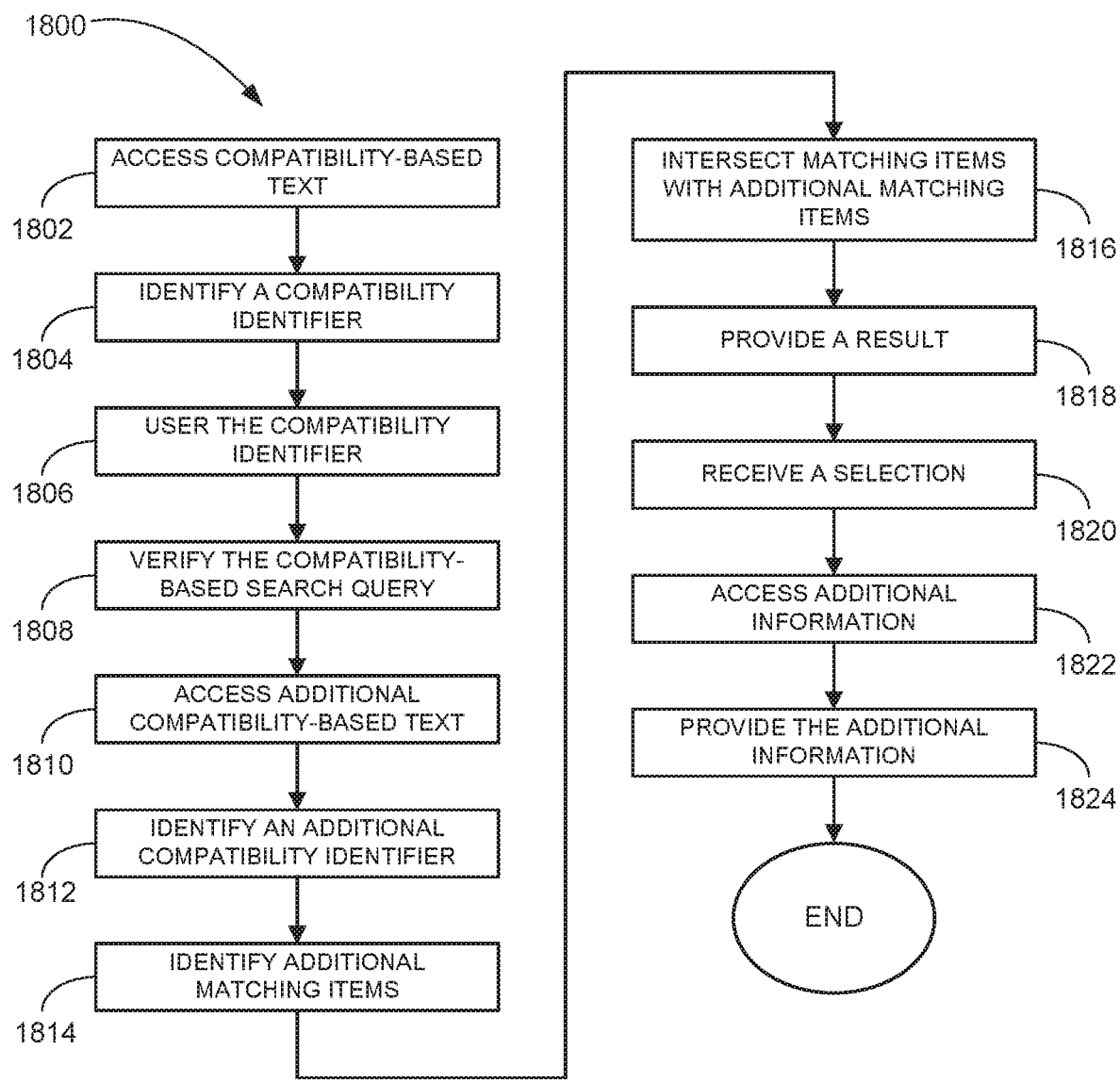

FIG. 18 illustrates a method 1800 for compatibility identification according to an example embodiment. The method 1800 may be performed by the client machine 102 and/or the provider 106 of the system 100 (see FIG. 1), or may be otherwise performed by another entity.

Compatibility-based text is accessed for an item at block 1802. The compatibility-based text may include, by way of example, a compatibility-based search query, a compatibility-based listing, or the like.

A compatibility identifier is identified based on the compatibility-based text at block 1804. The compatibility identifier may be associated with the item cluster 120 (see FIG. 1). The compatibility identifier is used to identify matching items at block 1806.

The compatibility-based search query may be verified based on identification of the matching items at block 1808. Additional compatibility-based text may be accessed for the item at block 1810.

An additional compatibility identifier may be identified based on the additional compatibility-based text at block 1812. The additional compatibility identifier may be associated with an additional item cluster 120.

The additional compatibility identifier may be used to identify additional matching items at block 1814. The matching items may be intersected with the additional matching items to obtain a matching result at block 1816.

A matching result is provided based on identification of the matching items and/or the intersecting at block 1818. The providing of the matching result may be based on verification the compatibility-based search query.

A selection of a particular matching item of the matching items may be received based on providing the matching result at block 1820. The additional information on the particular matching item may be accessed from an electronic catalog at block 1822.

Additional information on the particular matching item may be provided at block 1824. The providing of the additional information may be based on the accessing of the additional information.

Figure 19:
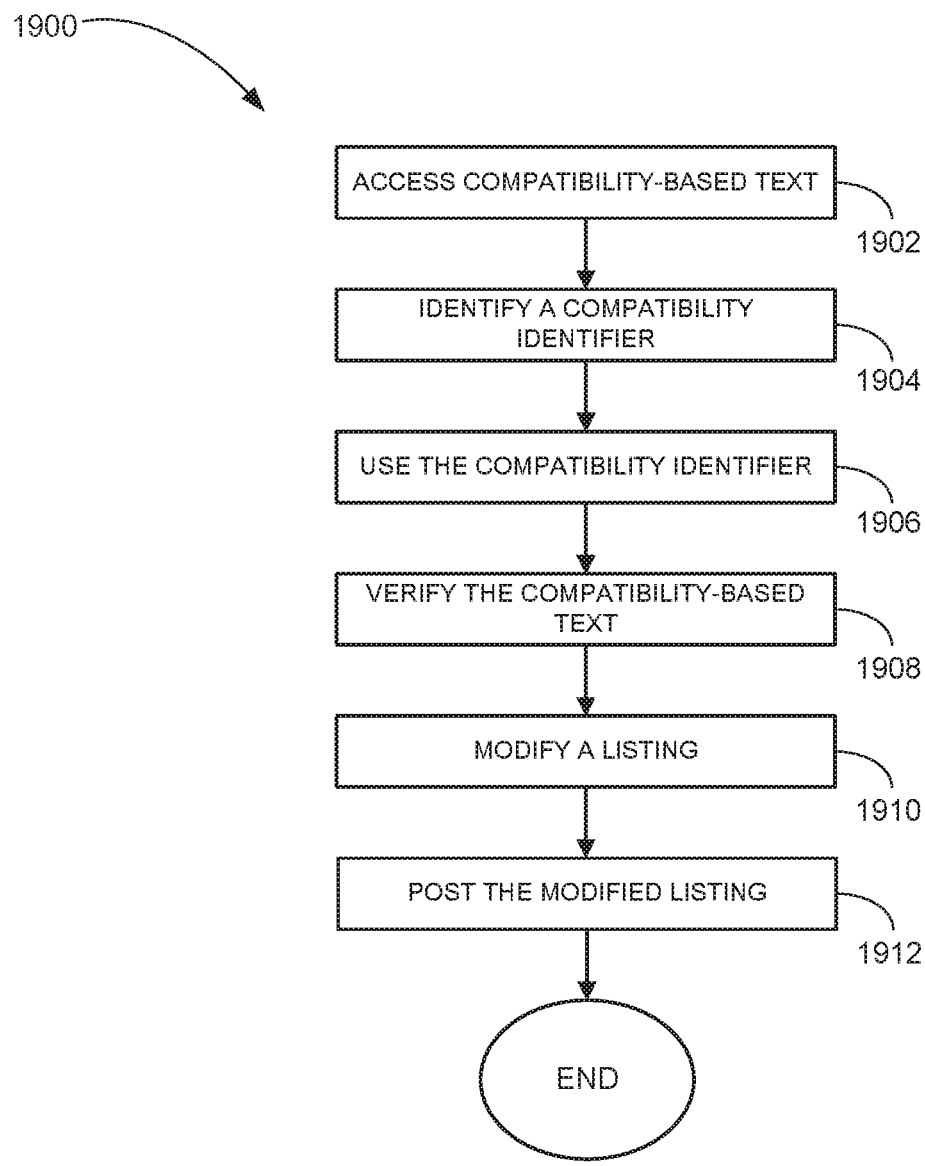

FIG. 19 illustrates a method 1900 for compatibility identification according to an example embodiment. The method 1900 may be performed by the client machine 102 and/or the provider 106 of the system 100 (see FIG. 1), or may be otherwise performed by another entity.

Compatibility-based text is accessed for an item at block 1902. The compatibility-based text may include, by way of example, a compatibility-based search query, a compatibility-based listing, or the like.

A compatibility identifier is identified based on the compatibility-based text at block 1904. The compatibility identifier may be associated with the item cluster 120 (see FIG. 1). The compatibility identifier is used to identify matching items at block 1906.

The compatibility-based text may be verified based on identification of the matching items at block 1908. A listing for the item is modified based on identification of the matching items at block 1910. The listing may include the compatibility-based text. Providing the listing may be based on verification of the compatibility-based search query. The modified listing of the item may be posted at block 1912.

Figure 20:
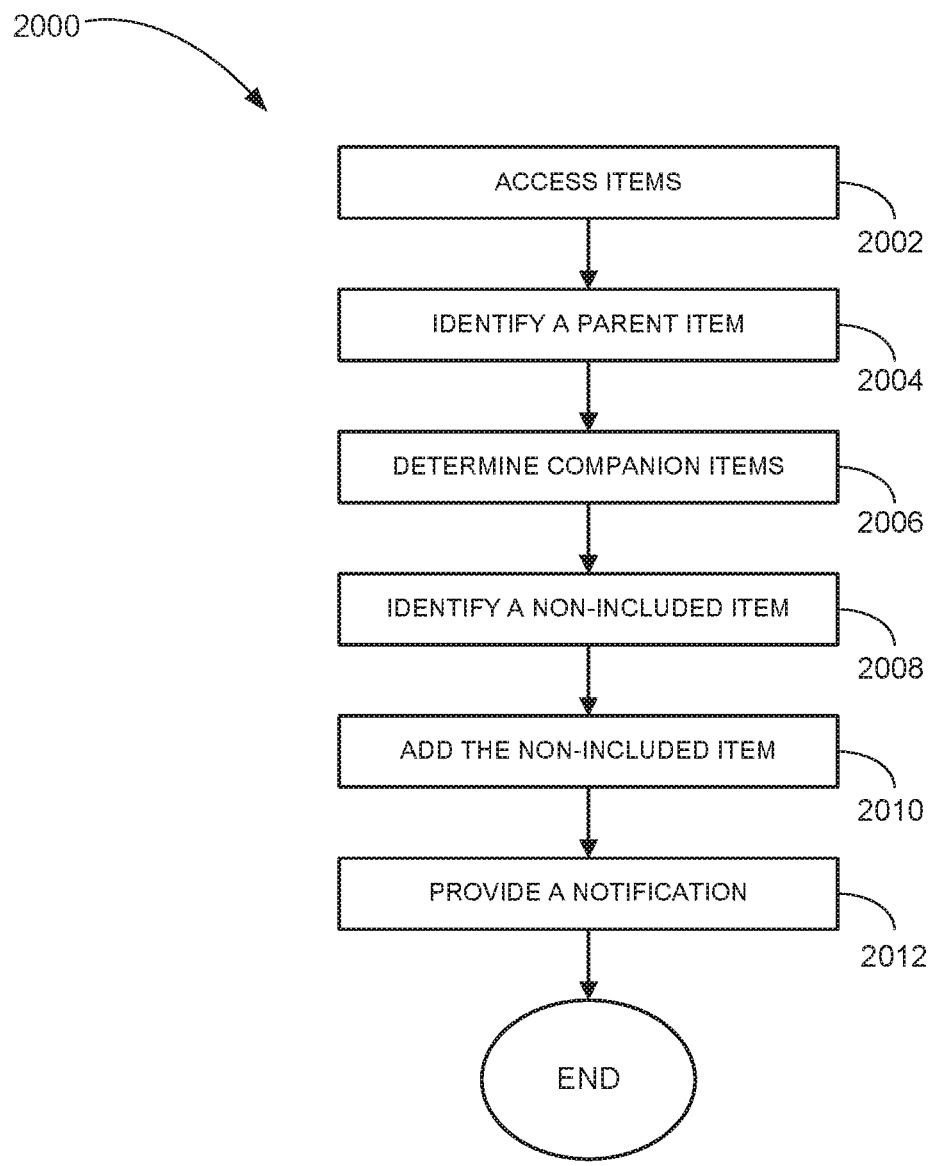
FIG. 20 is a flowchart illustrating a method for item analysis according to an example embodiment.

FIG. 20 illustrates a method 2000 for item analysis according to an example embodiment. The method 2000 may be performed by the client machine 102 and/or the provider 106 of the system 100 (see FIG. 1), or may be otherwise performed by another entity.

In an example embodiment, the method 200 may be used to identify additional items that may be of interest to a user based on items currently included in an electronic shopping basket.

Items in a shopping basket are accessed at block 2002. A parent item associated with the items is identified at block 2004. The parent item may be identified based on the compatibility data 114 (see FIG. 1) or may be otherwise identified.

Companion items associated with the parent item may be determined at block 2006. At block 2008, a non-included item in the shopping basket may be identified based on the accessing of the items and the determining of the companion items.

The non-included item may be added to the shopping basket at block 2010. A notification may be provided based on identification of the non-included item and/or the addition of the non-included item to the shopping basket at block 2012.

Figure 21:
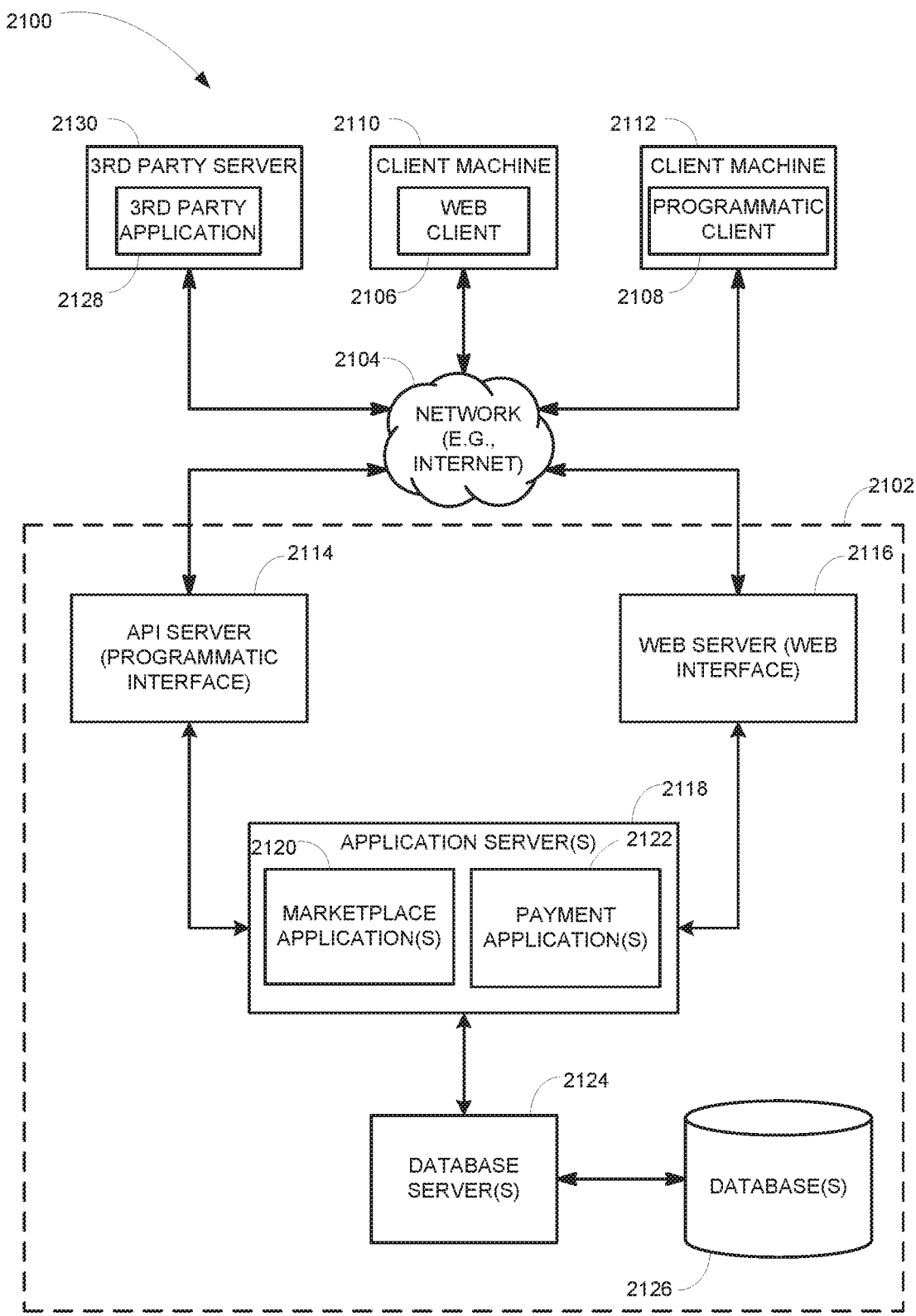
FIG. 21 is a network diagram depicting a network system, according to an example embodiment, having a client server architecture configured for exchanging data over a network.

FIG. 21 is a network diagram depicting a client-server system 2100, within which various embodiments may be deployed. By way of example, a network 2104 may include the functionality of the network 104, the provider 106 may be deployed within an application server 2118, and the client machine 102 may include the functionality of a client machine 2110 or a client machine 2112. The system 2100 may also be deployed as a part of other systems.

A networked system 2102, in the example form of a network-based marketplace or publication system, provides server-side functionality, via a network 2104 (e.g., the Internet or Wide Area Network (WAN)) to one or more clients. FIG. 21 illustrates, for example, a web client 2106 (e.g., a browser, such as the Internet Explorer browser developed by Microsoft Corporation of Redmond, Wash.), and a programmatic client 2108 executing on respective client machines 2110 and 2112.

An Application Program Interface (API) server 2114 and a web server 2116 are coupled to, and provide programmatic and web interfaces respectively to, one or more application servers 2118. The application servers 2118 host one or more marketplace applications 2120 and authentication providers 2122. The application servers 2118 are, in turn, shown to be coupled to one or more databases servers 2124 that facilitate access to one or more databases 2126.

The marketplace applications 2120 may provide a number of marketplace functions and services to users that access the networked system 2102. The authentication providers 2122 may likewise provide a number of payment services and functions to users. The authentication providers 2122 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 2120. While the marketplace and authentication providers 2120 and 2122 are shown in FIG. 21 to both form part of the networked system 2102, in alternative embodiments the authentication providers 2122 may form part of a payment service that is separate and distinct from the networked system 2102.

Further, while the system 2100 shown in FIG. 21 employs a client-server architecture, the various embodiments of the invention are of course not limited to such an architecture, and could equally well find application in a distributed, or peer-to-peer, architecture system, for example. The various marketplace and authentication providers 2120 and 2122 could also be implemented as standalone software programs, which need not have networking capabilities.

The web client 2106 accesses the various marketplace and authentication providers 2120 and 2122 via the web interface supported by the web server 2116. Similarly, the programmatic client 2108 accesses the various services and functions provided by the marketplace and authentication providers 2120 and 2122 via the programmatic interface provided by the API server 2114. The programmatic client 2108 may, for example, be a seller application (e.g., the TurboLister™ application developed by eBay Inc., of San Jose, Calif.) to enable sellers to author and manage listings on the networked system 2102 in an off-line manner, and to perform batch-mode communications between the programmatic client 2108 and the networked system 2102.

FIG. 21 also illustrates a third party application 2128, executing on a third party server machine 2130, as having programmatic access to the networked system 2102 via the programmatic interface provided by the API server 2114. For example, the third party application 2128 may, utilizing information retrieved from the networked system 2102, support one or more features or functions on a website hosted by the third party. The third party may, for example, provide one or more promotional, marketplace or payment functions that are supported by the relevant applications of the networked system 2102.

Figure 22:
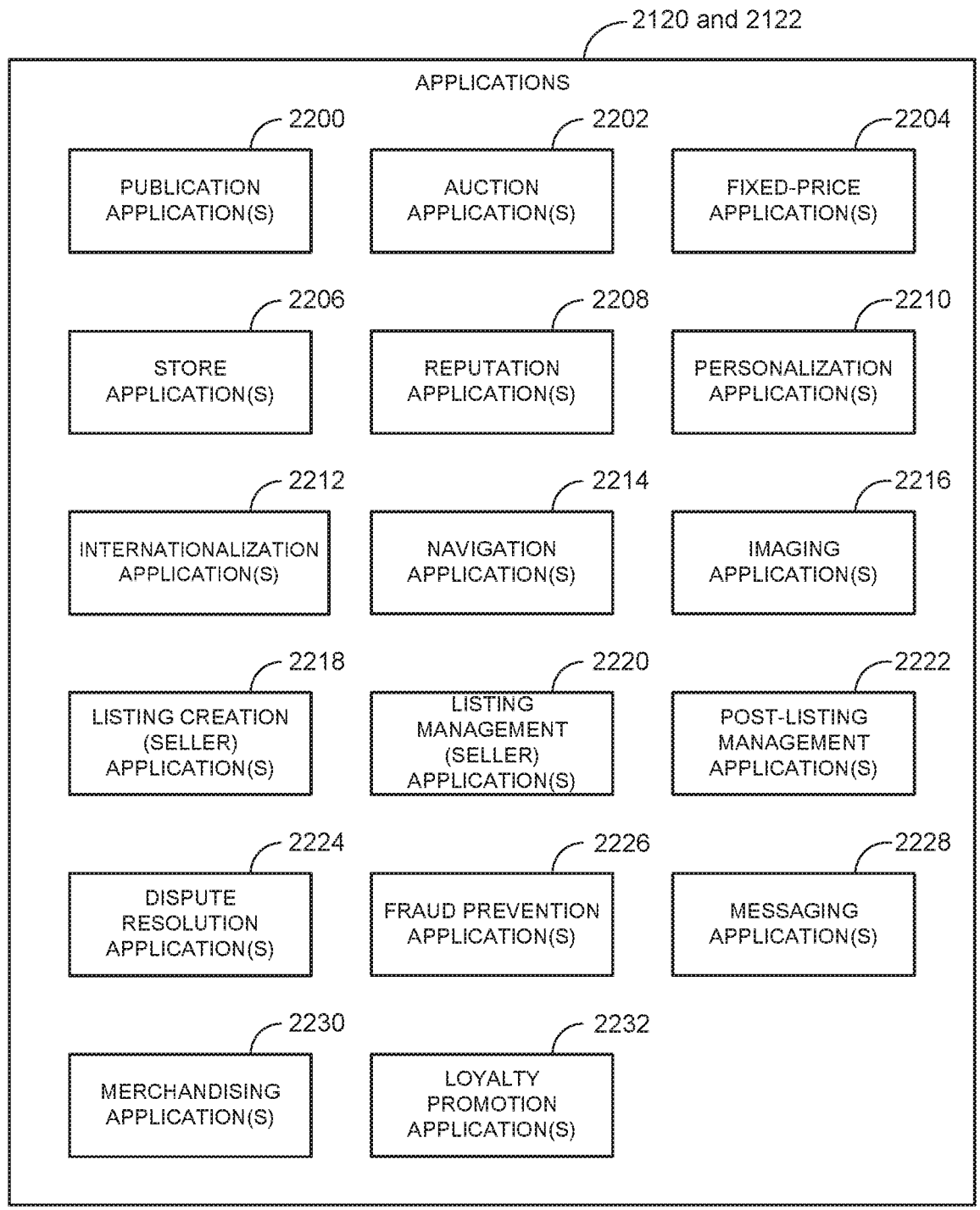
FIG. 22 is a block diagram illustrating an example embodiment of multiple network and marketplace applications, which are provided as part of the network-based marketplace.

FIG. 22 is a block diagram illustrating multiple applications 2120 and 2122 that may be provided as part of the networked system 2102 (see FIG. 21). The applications 2120 may be hosted on dedicated or shared server machines (not shown) that are communicatively coupled to enable communications between server machines. The applications themselves are communicatively coupled (e.g., via appropriate interfaces) to each other and to various data sources, so as to allow information to be passed between the applications or so as to allow the applications to share and access common data. The applications may operate to access one or more databases 2126 via the database servers 2124.

The networked system 2102 may provide a number of publishing, listing and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace applications 2120 are shown to include at least one publication application 2200 and one or more auction applications 2202 which support auction-format listing and price setting mechanisms (e.g., English, Dutch, Vickrey, Chinese, Double, Reverse auctions etc.). The various auction applications 2202 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 2204 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 2206 allow a seller to group listings within a "virtual" store, which may be branded and otherwise personalized by and for the seller. Such a virtual store may also offer promotions, incentives and features that are specific and personalized to a relevant seller.

Reputation applications 2208 allow users that transact, utilizing the networked system 2102, to establish, build and maintain reputations, which may be made available and published to potential trading partners. Consider that where, for example, the networked system 2102 supports person-to-person trading, users may otherwise have no history or other reference information whereby the trustworthiness and credibility of potential trading partners may be assessed. The reputation applications 2208 allow a user, for example through feedback provided by other transaction partners, to establish a reputation within the networked system 2102 over time. Other potential trading partners may then reference such a reputation for the purposes of assessing credibility and trustworthiness.

Personalization applications 2210 allow users of the networked system 2102 to personalize various aspects of their interactions with the networked system 2102. For example a user may, utilizing an appropriate personalization application 2210, create a personalized reference page at which information regarding transactions to which the user is (or has been) a party may be viewed. Further, a personalization application 2210 may enable a user to personalize listings and other aspects of their interactions with the networked system 2102 and other parties.

The networked system 2102 may support a number of marketplaces that are customized, for example, to operate in specific geographic regions. A version of the networked system 2102 may be customized for operations in the United Kingdom, whereas another version of the networked system 2102 may be customized for operations in the United States. Each of these versions may operate as an independent marketplace, or may be customized (or internationalized and/or localized) presentations of a common underlying marketplace. The networked system 2102 may accordingly include a number of internationalization applications 2212 that customize information (and/or the presentation of information) by the networked system 2102 according to predetermined criteria (e.g., geographic, demographic or marketplace criteria). For example, the internationalization applications 2212 may be used to support the customization of information for a number of regional websites that are operated by the networked system 2102 and that are accessible via respective web servers 2116.

Navigation of the networked system 2102 may be facilitated by one or more navigation applications 2214. For example, a search application (as an example of a navigation application) may enable key word searches of listings published via the networked system 2102. A browse application may allow users to browse various category, catalogue, or system inventory structures according to which listings may be classified within the networked system 2102. Various other navigation applications may be provided to supplement the search and browsing applications.

In order to make listings available via the networked system 2102 informative and attractive, the marketplace applications 2120 may include one or more imaging applications 2216 utilizing which users may upload images for inclusion within listings. An imaging application 2216 also operates to incorporate images within viewed listings. The imaging applications 2216 may also support one or more promotional features, such as image galleries that are presented to potential buyers. For example, sellers may pay an additional fee to have an image included within a gallery of images for promoted items.

Listing creation applications 2218 allow sellers conveniently to author listings pertaining to goods or services that they wish to transact via the networked system 2102, and listing management applications 2200 allow sellers to manage such listings. Specifically, where a particular seller has authored and/or published a large number of listings, the management of such listings may present a challenge. The listing management applications 2200 provide a number of features (e.g., auto-relisting, inventory level monitors, etc.) to assist the seller in managing such listings. One or more post-listing management applications 2202 also assist sellers with a number of activities that typically occur post-listing. For example, upon completion of an auction facilitated by one or more auction applications 2102, a seller may wish to leave feedback regarding a particular buyer. To this end, a post-listing management application 2202 may provide an interface to one or more reputation applications 2208, so as to allow the seller conveniently to provide feedback regarding multiple buyers to the reputation applications 2208.

Dispute resolution applications 2214 provide mechanisms whereby disputes arising between transacting parties may be resolved. For example, the dispute resolution applications 2214 may provide guided procedures whereby the parties are guided through a number of steps in an attempt to settle a dispute. In the event that the dispute cannot be settled via the guided procedures, the dispute may be escalated to a merchant mediator or arbitrator.

A number of fraud prevention applications 2226 implement fraud detection and prevention mechanisms to reduce the occurrence of fraud within the networked system 2102.

Messaging applications 2228 may be used to generate and deliver messages to users of the networked system 2102, such messages for example may advise users regarding the status of listings at the networked system 2102 (e.g., providing "outbid" notices to bidders during an auction process or to provide promotional and merchandising information to users). Respective messaging applications 2228 may utilize any one of a number of message delivery networks and platforms to deliver messages to users. For example, messaging applications 2228 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks.

Merchandising applications 2230 support various merchandising functions that are made available to sellers to enable sellers to increase sales via the networked system 2102. The merchandising applications 2230 also operate the various merchandising features that may be invoked by sellers, and may monitor and track the success of merchandising strategies employed by sellers.

The networked system 2102 itself, or one or more parties that transact via the networked system 2102, may operate loyalty programs that are supported by one or more loyalty/promotions applications 2232. For example, a buyer may earn loyalty or promotions points for each transaction established and/or concluded with a particular seller, and may be offered a reward for which accumulated loyalty points can be redeemed.

Figure 23:
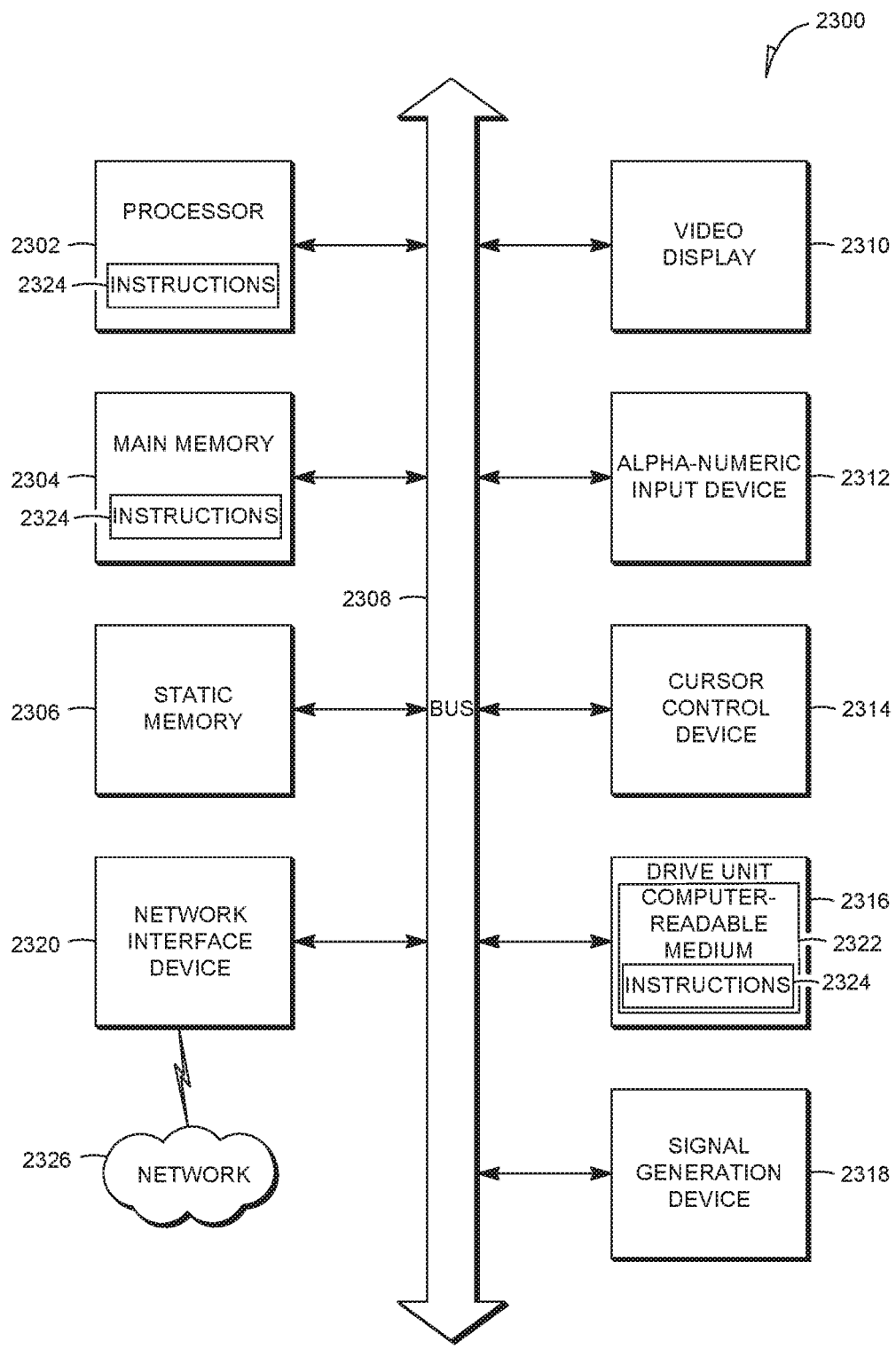
FIG. 23 is a block diagram of a machine in the example form of a computer system within which a set of instructions for causing the machine to perform any one or more of the methodologies discussed herein may be executed.

FIG. 23 shows a block diagram of a machine in the example form of a computer system 2300. A set of instructions may be executed by the computer system 2300, causing the machine to perform any one or more of the methods, processes, operations, or methodologies discussed herein. For example, the provider 106 and/or the compatibility search engine 122 may operate on one or more computer systems 2300 (see FIG. 1). The client machine 102 may include the functionality of the one or more computer systems 2300.

The machine may operate as a standalone device, or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 2300 includes a processor 2302 (e.g., a central processing unit (CPU) a graphics processing unit (GPU) or both), a main memory 2304 and a static memory 2306, which communicate with each other via a bus 2308. The computer system 2300 may further include a video display unit 2310 (e.g., a liquid crystal display (LCD) or a cathode ray tube (CRT)). The computer system 2300 also includes an alphanumeric input device 2312 (e.g., a keyboard), a cursor control device 2314 (e.g., a mouse), a drive unit 2316, a signal generation device 2318 (e.g., a speaker) and a network interface device 2320.

The drive unit 2316 includes a machine-readable medium 2322 on which is stored one or more sets of instructions (e.g., software 2324) embodying any one or more of the methodologies or functions described herein. The software 2324 may also reside, completely or at least partially, within the main memory 2304 and/or within the processor 2302 during execution thereof by the computer system 2300, the main memory 2304 and the processor 2302 also constituting machine-readable media.

The software 2324 may further be transmitted or received over a network 2326 via the network interface device 2320.

While the machine-readable medium 2322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical, and magnetic media, and carrier wave signals.

Certain systems, apparatus, applications or processes are described herein as including a number of modules or mechanisms. A module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information). The modules be implemented as hardware circuitry, optical components, single or multi-processor circuits, memory circuits, software program modules and objects, firmware, and combinations thereof, as appropriate for particular implementations of various embodiments.

In an example embodiment, free-form text associated with an item may be received. The item may be identified based on the free-form text. The item may be compatible with a parent item. The parent item may be identified based on the free-form text. An item descriptor may be identified in the free-form text. The item descriptor may be a particular term of the free-form text. Compatibility-based text may be constructed for the item based on identification of the parent item and the item descriptor. The compatibility-based text may be capable of being used to identify a plurality of matching items.

In an example embodiment, a free-form search query for an item may be received. An item identifier within the free-form search query may be identified. The item may be identified based on the item identifier. A parent item may be identified based on the extracting of the plurality of terms. A particular compatibility-based search query may be constructed for the item based on the parent item and identification of the item. The particular compatibility-based search query may be capable of being used to search for a plurality of matching items.

In an example embodiment, compatibility data may be accessed for an item. The compatibility data may include a plurality of parent items with which the item is compatible. A particular parent item within the compatibility data may be identified. An item cluster for the item and an additional item may be created based on compatibility of the item and the additional item with the particular parent item within the compatibility data. A compatibility identifier may be associated with the item cluster. The compatibility identifier may be associated with the parent item.

In an example embodiment, compatibility-based text for an item may be accessed. A compatibility identifier may be identified based on the compatibility-based text. The compatibility identifier may be associated with an item cluster. The compatibility identifier may be used to identify a plurality of matching items. A result may be provided based on identification of the plurality of matching items.

In an example embodiment, a plurality of items in a shopping basket may be accessed. A parent item associated with the plurality of items may be identified. A plurality of companion items associated with the parent item may be determined. A non-included item in the shopping basket may be identified based on the accessing of the plurality of items and the determining of the plurality of companion items.

Thus, methods and systems for item matching have been described. Although embodiments of the invention have been described with reference to specific examples, it will be evident that various modifications and changes may be made without departing from the broader scope of the various embodiments. Accordingly, the specification and drawings are to be regarded in an illustrative rather than a restrictive sense.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
    receiving, by one or more processors, a query;
    based on the query, identifying an item;
    based on the identification of an item and a compatibility identifier associated with the item, performing a compatibility search for one or more matching items associated with the compatibility identifier;
    providing, by the one or more processors, a result based on the compatibility search for the one or more matching items; and
    upon receiving an indication a matching item of the one or more matching items has been added to a shopping basket, identifying a companion item of the matching item.

2. The method of claim 1, further comprising:
    accessing a listing for the item;
    based on the listing, identifying a second compatibility identifier;
    based on the second compatibility identifier, identifying one or more additional matching items; and
    based on the identification of the one or more additional matching items, modifying the listing for the item.

3. The method of claim 2, further comprising:
    posting the modified listing of the item in an online marketplace.

4. The method of claim 1, further comprising:
    constructing compatibility-based text for the item based on the compatibility identifier and the identification of the item;
    identifying an additional compatibility identifier based on the compatibility-based text;
    using the additional compatibility identifier to identify a plurality of additional matching items; and
    intersecting the one or more matching items with the plurality of additional matching items to obtain the result; and
    wherein the providing of the result is based on the intersecting.

5. The method of claim 4, wherein the compatibility-based text comprises a compatibility-based search query.

6. The method of claim 4, wherein the compatibility-based text comprises a compatibility-based listing.

7. The method of claim 1, further comprising:
    accessing compatibility-based text for the item;
    identifying an additional compatibility identifier based on the compatibility-based text;

using the additional compatibility identifier to identify a plurality of additional matching items; and intersecting the one or more matching items with the plurality of additional matching items to obtain the result; and wherein the providing of the result is based on the intersecting.

8. The method of claim 1, wherein:

the received query is a free form search query; and the method further comprises:

converting the free form search query to a compatibility-based search;

verifying the compatibility-based search query based on identification of the one or more matching items; and wherein the providing of the result is responsive to the verifying the compatibility-based search query.

9. The method of claim 1, further comprising:

receiving a selection of the matching item of the one or more matching items based on the providing of the result; and providing additional information on the matching item.

10. The method of claim 9, further comprising:

accessing the additional information on the matching item from an electronic catalog, wherein the providing of the additional information is responsive to the accessing of the additional information.

11. A system comprising:

a memory that stores instructions; and one or more processors configured by the instructions to perform operations comprising:

receiving a query;

based on the query, identifying an item;

based on the identification of an item and a compatibility identifier associated with the item, performing a compatibility search for one or more matching items associated with the compatibility identifier;

providing a result based on the compatibility search for the one or more matching items; and upon receiving an indication a matching item of the one or more matching items has been added to a shopping basket, identifying a companion item of the matching item.

12. The system of claim 11, wherein the operations further comprise:

receiving a selection of the matching item from the one or more matching items; and providing additional information on the selected matching item.

13. The system of claim 11, wherein the operations further comprise:

constructing compatibility-based text for the item based on the compatibility identifier and the identification of the item;

identifying an additional compatibility identifier based on the compatibility-based text;

using the additional compatibility identifier to identify a plurality of additional matching items; and intersecting the plurality of matching items with the plurality of additional matching items to obtain the result; and wherein the providing of the result is based on the intersecting.

14. The system of claim 11, wherein the operations further comprise:

accessing compatibility-based text for the item;

identifying an additional compatibility identifier based on the compatibility-based text;

using the additional compatibility identifier to identify a plurality of additional matching items; and intersecting one or more matching items with the plurality of additional matching items to obtain the result; and wherein the providing of the result is based on the intersecting.

15. The system of claim 11, wherein:

the received query is a free form search query; and the operations further comprise:

converting the free form search query to a compatibility-based search;

verifying the compatibility-based search query based on identification of the one or more matching items; and wherein the providing of the result is responsive to the verifying the compatibility-based search query.

16. The system of claim 11, wherein the operations further comprise:

receiving a selection of the matching item of the one or more matching items based on the providing of the result; and providing additional information on the particular matching item.

17. The system of claim 16, wherein the operations further comprise:

accessing the additional information on the matching item from an electronic catalog; and wherein the providing of the additional information is responsive to the accessing of the additional information.

* * * * *

UNITED STATES PATENT AND TRADEMARK OFFICE
CERTIFICATE OF CORRECTION

PATENT NO. : 11,003,698 B2  
APPLICATION NO. : 15/428910  
DATED : May 11, 2021  
INVENTOR(S) : Aditya Arora et al.

Page 1 of 1

It is certified that error appears in the above-identified patent and that said Letters Patent is hereby corrected as shown below:

On the Title Page

Item (57), in Column 2, in "Abstract", Line 5, delete "duster." and insert -- cluster. --, therefor.

Signed and Sealed this  
Third Day of August, 2021

Drew Hirshfeld  
*Performing the Functions and Duties of the*  
*Under Secretary of Commerce for Intellectual Property and*  
*Director of the United States Patent and Trademark Office*